US012577409B2

(12) United States Patent
Brinkhuis et al.

(10) Patent No.: US 12,577,409 B2
(45) Date of Patent: Mar. 17, 2026

(54) POWDER COATING COMPOSITION

(71) Applicant: Allnex Netherlands B.V., Bergen op Zoom (NL)

(72) Inventors: Richard Hendrikus Gerrit Brinkhuis, Zwolle (NL); Robert Watson, Hookwood (GB); Martin Bosma, Arnhem (NL); Petrus Johannes Maria David Elfrink, Boxmeer (NL); Antonius Johannes Wilhelmus Buser, Wehl (NL); Pengcheng Yang, Arnhem (NL); Roberto Cavalieri, Romano d'Ezzelino (IT); Massimiliano Censi, Cassola (IT); Robertino Chinellato, Spinea (IT); Alessandro Minesso, Morgano (IT)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 0 days.

(21) Appl. No.: 18/425,558

(22) Filed: Jan. 29, 2024

(65) Prior Publication Data

US 2024/0166884 A1 May 23, 2024

Related U.S. Application Data

(62) Division of application No. 16/956,814, filed as application No. PCT/EP2019/051844 on Jan. 25, 2019, now Pat. No. 11,920,058.

(30) Foreign Application Priority Data

Jan. 26, 2018 (EP) .................................... 18153693
Dec. 4, 2018 (EP) .................................... 18210170

(51) Int. Cl.

| | |
|---|---|
| ***C09D 5/03*** | (2006.01) |
| ***C08G 18/42*** | (2006.01) |
| ***C08G 18/60*** | (2006.01) |
| ***C08G 18/62*** | (2006.01) |
| ***C08G 18/73*** | (2006.01) |
| ***C08G 18/75*** | (2006.01) |
| ***C08J 3/12*** | (2006.01) |
| ***C08K 5/09*** | (2006.01) |
| ***C08K 5/105*** | (2006.01) |
| ***C08L 33/08*** | (2006.01) |
| ***C08L 63/00*** | (2006.01) |
| ***C08L 75/06*** | (2006.01) |

(52) U.S. Cl.

CPC ............ *C09D 5/03* (2013.01); *C08G 18/4211* (2013.01); *C08G 18/606* (2013.01); *C08G 18/6225* (2013.01); *C08G 18/73* (2013.01); *C08G 18/755* (2013.01); *C08J 3/12* (2013.01); *C08K 5/09* (2013.01); *C08K 5/105* (2013.01); *C08L 33/08* (2013.01); *C08L 63/00* (2013.01); *C08L 75/06* (2013.01); *C08G 2150/20* (2013.01); *C08L 2312/00* (2013.01)

(58) Field of Classification Search

CPC .... C09D 5/03; C08G 18/4211; C08G 18/606; C08G 18/6225; C08G 18/73; C08G 18/755; C08G 2150/20; C08J 3/12; C08K 5/09; C08K 5/105; C08L 33/08; C08L 63/00; C08L 75/06; C08L 2312/00

See application file for complete search history.

(56) References Cited

U.S. PATENT DOCUMENTS

| | | | | |
|---|---|---|---|---|
| 2,759,913 | A | 8/1956 | Hulse | |
| 4,217,396 | A | 8/1980 | Heckles | |
| 4,408,018 | A | 10/1983 | Bartman et al. | |
| 4,602,061 | A | 7/1986 | Akkerman | |
| 4,871,822 | A | 10/1989 | Brindopke et al. | |
| 6,368,725 | B1 | 4/2002 | Gräf et al. | |
| 6,384,102 | B1 | 5/2002 | Moens et al. | |
| 2007/0173602 | A1 | 7/2007 | Brinkman et al. | |
| 2013/0041091 | A1 | 2/2013 | Brinkhuis et al. | |
| 2013/0210986 | A1 | 8/2013 | Brinkhuis et al. | |
| 2015/0024194 | A1 | 1/2015 | Reno et al. | |
| 2016/0060389 | A1* | 3/2016 | Brinkhuis .................. | C08J 3/24 525/445 |
| 2016/0168320 | A1 | 6/2016 | Brinkhuis et al. | |
| 2017/0173602 | A1 | 6/2017 | Erickson et al. | |
| 2018/0163081 | A1 | 6/2018 | Goedegebuure et al. | |
| 2018/0163082 | A1 | 6/2018 | Goedegebuure et al. | |
| 2018/0251656 | A1 | 9/2018 | Goedegebuure et al. | |
| 2018/0282477 | A1 | 10/2018 | Brinkhuis et al. | |

FOREIGN PATENT DOCUMENTS

| | | |
|---|---|---|
| EP | 0 326 723 | 9/1989 |
| EP | 0 410 241 | 7/1990 |
| EP | 1 813 630 | 8/2007 |

(Continued)

OTHER PUBLICATIONS

International Search Report issued Mar. 22, 2019 in International (PCT) Application No. PCT/EP2019/051844.
Noomen, A.; Progress in Organic Coatings, 1997, pp. 137-142.

*Primary Examiner* — Jiangtian Xu

(74) *Attorney, Agent, or Firm* — WENDEROTH, LIND & PONACK, L.L.P.

(57) ABSTRACT

The invention relates to powder coating compositions suitable for low temperature powder coating crosslinking typically at curing temperature is between 75 and 140° C. which can be used for powder coating temperature-sensitive substrates like MDF, wood, plastic or temperature sensitive metal alloys.

13 Claims, No Drawings

(56) References Cited

FOREIGN PATENT DOCUMENTS

| | | | |
|---|---|---|---|
| EP | 2 374 836 | 10/2011 | |
| JP | 11-31545 | 2/1999 | |
| RU | 99 111 961 | 3/2001 | |
| RU | 2 200 747 | 3/2003 | |
| RU | 2 629 288 | 8/2017 | |
| WO | 00/17242 | 3/2000 | |
| WO | 2009/029432 | 3/2009 | |
| WO | WO-2009029432 A2 * | 3/2009 | ............... B05D 1/06 |
| WO | 2012/035091 | 3/2012 | |
| WO | 2014/166880 | 10/2014 | |
| WO | 2016/166371 | 10/2016 | |
| WO | 2018/007373 | 1/2018 | |

* cited by examiner

POWDER COATING COMPOSITION

BACKGROUND OF THE INVENTION

The invention relates to powder coating compositions that are curable at low curing temperatures, to processes for the manufacture of such powder coating compositions, to processes for coating articles using said powder coating composition and to resulting coated articles. The invention also relates to specific polymers and catalyst systems for use in the powder coating compositions.

DESCRIPTION OF THE RELATED ART

Powder coatings are dry, finely divided, free flowing, solid materials at room temperature and have gained popularity in recent years over liquid coatings. Powder coatings are generally cured at elevated temperatures between 120° C. and 200° C., more typically between 140° C. and 180° C. High temperatures are required to provide for sufficient flow of the binder to allow film formation and achieve good coating surface appearance, but also for achieving high reactivity for a crosslinking reaction. At low curing temperatures, one may face reaction kinetics that will not allow short cure times when demanding full mechanical and resistance property development; on the other hand, for systems where a high reactivity of the components may be created, the coatings are likely have a poor appearance due to the relatively high viscosity of such systems at such lower temperatures, rapidly increasing further as the cure reaction proceeds: the time-integrated fluidity of such systems is too low to achieve sufficient leveling (see e.g. Progress in Organic Coatings, 72 page 26-33 (2011)). Especially when targeting thinner films, appearance may be limiting. Moreover, very high reactivities may lead to problems due to premature reaction when formulating powder paints in an extruder.

In consequence of this temperature restriction powder coatings are not easily employed in coating heat-sensitive substrates such as medium density fibre-board (MDF), wood, plastics and certain metal alloys. Developments are ongoing to reduce curing temperatures with the focus on green technologies and corresponding pressure to reduce energy costs and to be able to coat temperature sensitive substrates. There is also an advantage to having powder coatings which cure at low temperature when applied onto massive metal components, as such components are slow to heat.

Recently there has been a good deal of effort in finding powder coatings that cure at lower temperature. Accordingly, the term “lower” temperatures in the powder coatings field generally implies a temperature significantly higher than room temperature but lower than 160° C., preferably lower than 150° C., more preferably lower than 140° C., even more preferably lower than 130° C. or even below 120° C. It has generally been found that it is difficult to achieve sufficient high reactivity to obtain the film crosslink density required for performance within an acceptable cure time window when using low curing temperatures, typically below 150° C. and especially at or below 140° C., to achieve suitable chemical resistance, mechanical properties like impact resistance, flexibility, surface hardness and weathering properties and at the same time also to achieve good flow and coating appearance.

Systems do exist which cure at very low temperatures in the range between 120-130° C. These tend to be epoxy curing (e.g. triglycidyl isocyanurate (TGIC)) polyester systems. Generally, such systems suffer from poor appearance and are only used to produce textured coatings. Appearance can be improved by allowing lower Tg powders (requiring refrigerated storage) or designing powder paints with crystalline components that melt between Tg and cure temperature, but both approaches introduce complications.

Another approach to allow for low temperature cure of powder coatings, is the use of UV-initiated radical cure for crosslinking. This provides an opportunity to combine low temperature curing and still have good appearance in limited cure time windows; still, this approach suffers from disadvantages as the need for a radiation cure set-up, non-homogeneous irradiation for complex shape substrates, potential issues with limited penetration depth in pigmented systems, and relatively high costs associated with binders and photo-initiators.

A general problem with the described prior art crosslinkable low temperature curable compositions is that the curing speed is low or if the curing speed is higher, the resulting coating appearance is poor, and may provide complications during extrusion formulation or that components are used that are expensive or less desirable from an environmental point of view. Combining all the demands requires a system that intrinsically has the required proper reactivity level, and of which the curing kinetics can be controlled in high level of detail to allow good appearance in combination with full chemical and mechanical resistance build-up within challenging combinations of cure time, cure temperature and film thickness.

Therefore, there still is a desire for a powder coating composition that can cure at low temperatures with a high curing speed to get acceptable short curing times but nevertheless with sufficiently long open time to allow flow and coalescence and achieve good film formation with good coating appearance. ‘Open time’ refers here to the time at the cure temperature before reaction progress has raised viscosity so far that further flow of the paint has become insignificant.

BRIEF SUMMARY OF THE INVENTION

The present invention addresses one or more of these problems by providing a powder coating composition comprising one or more crosslinkable components and a catalyst characterised in that the one or more crosslinkable components are crosslinkable by Real Michael Addition (RMA) reaction, the powder coating composition comprising a. a crosslinkable component A having at least 2 acidic C—H donor groups in activated methylene or methine,
b. a crosslinkable component B having at least 2 activated unsaturated acceptor groups C═C, which react with component A by Real Michael Addition (RMA) to form a crosslinked network,
c. a latent catalyst system C comprising a strong base or a precursor of a strong base to catalyze the RMA crosslinking reaction with a delay at a curing temperature below 200° C., preferably below 175° C., more preferably below 150° C., 140, 130 or even 120° C. and preferably at least 70° C., preferably at least 80, 90 or 100° C., wherein the catalyst system C is a latent catalyst system LC selected from the group of a. a latent catalytic system LCC having chemical latency comprising components that react at the curing temperature to initiate the reaction between crosslinkable components A and B with a delay, said latent catalytic system LCC comprising In embodiment LCC1:

a) a weak base C2, b) an activator C1 reactive with C2 or a protonated C2 at the curing temperature, c) optionally further comprising an acid C3, preferably a protonated C2.

wherein in case of embodiment LCC2:

a) weak base C2 is a Michael addition donor S2 and b) activator C1 is a Michael acceptor S1 comprising an activated unsaturated group C═C reactive with S2 at the curing temperature, c) optionally further comprising an acid C3 being an acid S3 of which the corresponding base also is a Michael addition donor, preferably a protonated S2, wherein in case S1 is an acrylate, S2 has a pKa of the conjugated acid below 8, preferably below 7 and more preferably below 6, wherein pKa is defined as the value in an aqueous environment, and in case S1 is a methacrylate, fumarate, itaconate or maleate, S2 has a pKa of the conjugated acid below 10.5, preferably below 9, more preferably below 8 or combinations of the embodiments LCC1 and LCC2, b. A latent catalyst system LCE having evaporative latency comprising a base blocked with a volatile acid or a weak base which on protonation forms a volatile acid and which volatile acid evaporates at the curing temperature and preferably additional free volatile acid.

c. A latent catalyst system LCP having physical latency wherein a catalytic system, preferably a strong base or a latent catalyst system, is present which is physically separated and inaccessible for chemical reaction in the powder at or below a compounding temperature and which is accessible for chemical reaction at the curing temperature, preferably chosen from a)a latent catalyst system LCP1 comprising a strong base catalyst having a melting temperature below the curing temperature and above the compounding temperature, preferably above 70, 80, 90 or 100° C. or b)a latent catalyst system LCP2 comprising an active strong base catalyst species which is encapsulated in- or mixed with- a material which releases the catalyst at a temperature below the curing temperature and above the compounding temperature wherein preferably the material has a melting temperature or, in case of an amorphous material a glass transition temperature, below the curing temperature and above the compounding temperature, c) a latent catalyst system LCP3 comprising a photo-based generator component that releases a base, upon irradiation with an appropriate wavelength, or combinations of catalyst systems LCC, LCE and LCP.

The inventors found that the RMA powder coating composition is very suitable for powder coatings that can be cured at low temperatures with a relatively high curing speed, acceptable short curing times but nevertheless with sufficiently long open time to allow film formation and achieve good crosslinking with good coating appearance using any of the latent base catalyst systems as described in more detail below.

In another aspect the invention relates to a process for the preparation of a powder coating composition according to the invention and to a method for powder-coating a substrate. In the method the curing temperature Tcur is chosen between 75 and 200° C., preferably between 80 and 180° C. and more preferably between 80 and 160, 150, 140, 130 or even 120° C. and preferably also uses infrared heating. The curing is preferably characterised by a curing profile, as determined by measuring the conversion of the unsaturated bonds C═C of component B as a function of time by FTIR, wherein the ratio of the time to go from 20% to 60% C═C conversion to the time to reach 20% conversion is less than 1, preferably less than 0.8, 0.6, 0.4 or 0.3, preferably with the time to reach 60% conversion being less than 30, 20, 10 or 5 min. and preferably with the time to reach 20% conversion of at least 1, preferably at least 2, 3, 5, 8 or 12 minutes when cured at 100° C. Preferably the melt viscosity at the curing temperature is less than 60 Pas, more preferably less than 40, 30, 20, 10 or even 5 Pas. The melt viscosity can e.g. be measured with a Brookfield CAP 2000 cone-and-plate rheometer according to ASTM D4287, using spindle #5 and is to be measured at the very onset of the reaction or on the powder coating composition without catalyst activity.

The powder coating composition has the particular advantage that it can be used at low curing temperatures and therefore the method for powder coating a substrate, preferably a temperature sensitive substrate, preferably uses a curing temperature between 75 and 140° C., preferably between 80 and 130 or 120° C., most preferably between 100 and 120° C. This makes it possible to use the method for powder coating temperature sensitive substrates, preferably MDF, wood, plastic or temperature sensitive metal substrates like alloys. The invention therefore also relates in particular to such articles coated with a powder coating composition according to the invention. It was found that good coating properties could be obtained with good crosslinking density XLD and resulting good coating properties.

In another aspect the invention relates to the use of the latent catalyst systems as described herein for the preparation of RMA crosslinkable powder coatings compositions for catalysing the crosslinking reaction in RMA crosslinkable powder coatings compositions at curing temperatures below 200° C., preferably below 180° C., more preferably below 160, 140, or even 120° C. and above 75, 80, 90 or 100° C.

In yet another aspect the invention relates to an RMA crosslinkable polymer and to the use of said RMA crosslinkable polymer in RMA crosslinkable powder coatings. This RMA crosslinkable polymer is aRMA crosslinkable donor polymer. This RMA crosslinkable polymer is preferably chosen from the group of acrylic, polyester, polyester-amide and polyester-urethane polymers comprising a. one or more components A comprising at least 2 acidic C—H donor groups in activated methylene or methine in a structure Z1(—C(—H)(—R)—)Z2 wherein R is hydrogen, a hydrocarbon, an oligomer or a polymer, and wherein Z1 and Z2 are the same or different electron-withdrawing groups, preferably chosen from keto, ester or cyano or aryl groups, preferably an activated C—H derivative having a structure according to formula 1:

Formula 1

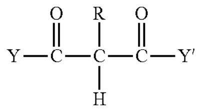

wherein R is hydrogen or an optionally substituted alkyl or aryl and Y and Y' are identical or different substituent groups, preferably alkyl, aralkyl or aryl, or alkoxy or wherein in formula 1 the —C(═O)-Y and/or —C(═O)—Y' is replaced by CN or aryl, no more than one aryl, or wherein Y or Y' can be —NRR' (R and R' are H or optionally substituted alkyl) but preferably not both, said component A preferably being malonate, acetoacetate, malonamide, acetoacetamide or cyanoacetate groups and most preferably malonate providing at least 50, preferably 60, 70 or even 80% of the total of C—H acidic groups in crosslinkable component A, wherein R, Y or Y' provide connection to the polymer, b. optionally one or more components B comprising at least 2 activated unsaturated RMA acceptor groups, preferably acryloyl, methacryloyl, itaconates, citraconate, crotonate, cinnamate, maleate or fumarate functional groups forming an A/B hybrid polymer, and c. optionally one or more components of catalytic system C, wherein the polymer a. has a number average molecular weight Mn, as determined with GPC, of at least 450 gr/mole, preferably at least 1000, more preferably at least 1500 and most preferably at least 2000 gr/mole, b. has a weight average molecular weight Mw, as determined with GPC, of at most 20000 gr/mole, preferably at most 15000, more preferably at most 10000 and most preferably at most 7500 gr/mole, c. preferably has a molecular weight distribution Mw/Mn below 4, more preferably below 3, d. has an equivalent weight EQW in C—H of at least 150, 250, 350, 450 or 550 gr/mole and preferably at most 2500, 2000, 1500, 1250 or 1000 gr/mole and a number average functionality of reactive groups C—H between 1-25, more preferably 1.5-15 even more preferably 2-15, most preferably 2.5-10 C—H groups per molecule, e. preferably has a melt viscosity at a temperature in the range between 100 and 140° C. less than 60 Pas, more preferably less than 40, 30, 20, 10 or even 5 Pas f. preferably comprises amide, urea or urethane bonds and/or comprises high Tg monomers, preferably cycloaliphatic or aromatic monomers, in particular polyester monomers chosen from the group of 1,4-dimethylol cyclohexane (CHDM), tricyclodecanedimethanol (TCD diol), isosorbide, penta-spiroglycol or hydrogenated bisphenol A and tetramethyl-cyclobutanediol, g. has a Tg above 25° C., preferably above 35° C., more preferably above 40, 50 or even 60° C. as determined by DSC at a heating rate of 10° C./min or is a crystalline polymer with a melting temperature between 40° C. and 150, preferably 130° C., preferably at least 50 or even 70° C. and preferably lower than 150, 130 or even lower than 120° C. (as determined by DSC at a heating rate of 10° C./min).

DETAILED DESCRIPTION OF THE INVENTION

The inventors found that the RMA powder coating composition of the invention can, compared to conventional powder coating compositions, be cured at relatively low temperatures with a high curing speed. The latent base catalyst system provides open time and good levelling at low temperatures. A latent catalyst system is a catalyst system that provides a delay of the initial stages of curing at the curing temperature. The delay is controlled by the choice of the components of the catalytic system and is chosen for a particular chosen combination of RMA crosslinkable components A and B in view of providing a preferred curing profile as described below. The RMA crosslinking reaction between components A and B requires the presence of a base, typically defined herein as a "strong base". This strong base is a base able to catalyse the RMA at Tcur. In the present invention, as will be explained herein below in more details, such strong base is generated through a latent catalyst system C. This latent catalytic system C can be a chemical latent system LCC (LCC1 and/or LCC2), an evaporative latent system LCE or a physical latent system LCP or a combination of at least 2 of the mentioned systems.

In a preferred embodiment the powder coating composition has a catalyst system LCC with chemical latency. Suitable catalyst system LCC1 comprises In embodiment LCC1:

a) a weak base C2, b) an activator C1 reactive with C2 or a protonated C2 at the curing temperature, c) optionally further comprising an acid C3, preferably a protonated C2.

The chemical latency is obtained by time required for the chemical reaction of the weak base C2 with the activator C1 or S1 and preferably including an acid C3 to further increase the latency.

In a preferred embodiment the powder coating composition comprises a chemical latent catalyst system embodiment LCC1 wherein the activator C1 is selected from the group of epoxide, carbodiimide, oxetane, oxazoline or aziridine functional components, preferably an epoxide or carbodiimide, and wherein the weak base C2 preferably has a pKa of the conjugate acid of more than 1, preferably 1.5, more preferably 2 and even more preferably at least 3 units lower than the pKa of the acidic C—H groups of the majority component A and wherein C2 preferably is a weak base nucleophile anion chosen from the group carboxylate, phosphonate, sulphonate, halogenide or phenolate anions or salts thereof or a non-ionic nucleophile, preferably a tertiary amine, more preferably weak base C2 is a weak base nucleophile anion chosen from the group carboxylate, halogenide or phenolate salts or 1,4-diazabicyclo-[2.2.2]-octane (DABCO) and the latent catalyst system preferably also comprises acid C3 having a pKa of more than 1, preferably 1.5, more preferably 2 and even more preferably at least 3 units lower than the pKa of the acidic C—H groups of majority component A, wherein acid C3 preferably is a protonated C2.

In an alternative embodiment the powder coating composition comprises a chemical latent catalyst system embodiment LCC2 comprising:

a) weak base C2 is a Michael addition donor S2 and b) activator C1 is a Michael acceptor S1 comprising an activated unsaturated group C═C reactive with S2 at the curing temperature, c) optionally further comprising an acid C3 being an acid S3 of which the corresponding base also is a Michael addition donor, preferably a protonated S2, wherein in case S1 is an acrylate, S2 has a pKa of the conjugated acid below 8, preferably below 7 and more preferably below 6, wherein pKa is defined as the value in an aqueous environment, and in case S1 is a methacrylate, fumarate, itaconate or maleate, S2 has a pKa of the conjugated acid below 10.5, preferably below 9, more preferably below 8.

Combinations of the embodiments LCC1 and LCC2 are also possible. Preferably the powder coating composition comprises a latent catalyst system embodiment LCC2, wherein

- the weak base S2 is preferably selected from the group of phosphines, N-alkylimidazoles and fluorides or is a weak base nucleophile anion X- from an acidic X—H group containing compound wherein X is N, P, O, S or C, wherein anion X- is a Michael Addition donor reactive with activator S1 and anion X- is characterized by a pKa of the corresponding conjugate acid X—H of less than 8 and in addition more than 1, preferably 1.5, more preferably 2 and even more preferably at least 3 units lower than the pKa of the acidic C—H groups of majority component A, and
- the latent catalyst system preferably also comprises acid S3 having a pKa of more than 1, preferably 1.5, more preferably 2 and even more preferably at least 3 units lower than the pKa of the acidic C—H groups of majority component A, wherein acid S3 preferably is a protonated S2.

For components S3, or their deprotonated versions S2, in embodiment LCC2 to be able to provide a suitable kinetic profile, it is important that the reaction of these components with Michael Addition acceptor groups can take place with a suitable rate, to avoid a too fast reaction, and to be able to provide a meaning delay in curing under thermal conditions relevant for powder paints. Finding a suitable reactivity window requires choosing suitable combination of S3 XH (or S2 X-) components and acceptor functional groups to use in the powder paint compositions.

WO2014/16680 describes compositions that are RMA crosslinkable using as the catalyst C a combination of acid X—H and the anion X- of an acid wherein the anion X- is also a Michael addition donor reactive with component B. The use in powders is mentioned however the document focusses on solvent borne compositions curable at room temperature (22° C. according to the examples) and does not describe powder coating compositions curable at high temperature (i.e. at temperature higher than room or ambient temperature). For such solvent borne room temperature curable compositions combinations of acrylate acceptor groups with components X—H were reported using as catalyst X—H/$X^-$ components such as succinimide, 1,2,4-triazole and benzotriazole. It was however found that such combinations do not work for powder paint compositions curable at high temperature because they do not provide the desired amount of delay as the reactivity of the X- anions towards acrylates is too high.

It was found that for powder paint compositions comprising acrylate acceptor groups catalyst system LCC2 can be used wherein components S1 are acrylate acceptor groups and components S2 and S3 are $X^-$ /X—H components having acid pKa below 8, more preferably below 7, 6 or even 5.5. Examples of useful X—H components for acrylate acceptor containing powder paint compositions include cyclic 1,3-diones as 1,3-cyclohexanedione (pKa 5.26) and dimedone (5,5-dimethyl-1,3-cyclohexanedione, pKa 5.15), ethyl trifluoroacetoacetate (7.6), Meldrum's acid (4.97). Preferably, X—H components are used that have a boiling point of at least 175° C., more preferably at least 200° C.

It was further found that for powder paint compositions comprising methacrylate, fumarate, maleate or itaconate acceptor groups a catalyst system LCC2 can be used wherein components S1 are acceptor groups as listed above, preferably methacrylate, itaconate or fumarate groups, and components S2 and S3 are $X^-$ / X—H components having acid pKa below 10.5, more preferably below 9.5, 8 or even below 7.

The pKa values referred to, are aqueous pKa values at ambient conditions (21° C.). They can be readily found in literature and if needed, determined in aqueous solution by procedures known to those skilled in the art. A list of pKa values of relevant components is given below.

| | | | |
|---|---|---|---|
| Succinimide | 9.5 | Isatine | 10.3 |
| Ethosuximide | 9.3 | Uracil | 9.9 |
| Phthalimide | 8.3 | 4-nitro-2-methylimidazole | 9.6 |
| 5,5-dimethyl hydantoin | 10.2 | Phenol | 10.0 |
| 1,2,4-triazole | 10.2 | Ethylacetoacetate | 10.7 |
| 1,2,3-triazole | 9.4 | ethyl cyano-acetate | 9.0 |
| benzotriazole | 8.2 | acetylacetone | 9.0 |
| benzene-sulfonamide | 10.1 | 1,3-cyclohexanedione | 5.3 |
| Nitromethane | 10.2 | Saccharin | 2.0 |
| nitroethane | 8.6 | barbituric acid | 4.0 |
| 2-nitro-propane | 7.7 | diethylmalonate | 13.0 |

A most preferred activator C1 in embodiment LCC1 is an epoxy group. Suitable choices for the epoxide as preferred activator C1 are cycloaliphatic epoxides, epoxidized oils and glycidyl type epoxides. Suitable components C1 are described in U.S. Pat. No. 4,749,728 Col 3 Line 21 to 56 and include C2-18 alkylene oxides and oligomers and/or polymers having epoxide functionality including multiple epoxy functionality. Particularly suitable alkylene oxides include 1,2-hexylene oxide, tert-butyl glycidyl ether, phenyl glycidyl ether, glycidyl acetate, glycidyl esters of versatic esters, glycidyl methacrylate and glycidyl benzoate. Useful multifunctional epoxides include bisphenol A diglycidyl ether, as well as higher homologues of such BPA epoxy resins, diglycidyl adipate, 1,4-diglycidyl butyl ether, glycidyl ethers of Novolac resins, glycidyl esters of diacids such as Araldite PT910 and PT912 (Huntsman), TGIC and other commercial epoxy resins. Bisphenol A diglycidyl ether, as well as its solid higher molecular weight homologues are preferred epoxides. Also useful are acrylic (co) polymers having epoxide functionality derived from glycidyl methacrylate. In a preferred embodiment, the epoxy components are oligomeric or polymeric components with an Mn of at least 400 (750, 1000, 1500). Other epoxide compounds include 2-methyl-1,2-hexene oxide, 2-phenyl-1,2-propene oxide (alpha-methyl styrene oxide), 2-phenoxy methyl-1,2-propene oxide, epoxidized unsaturated oils or fatty esters, and 1-phenyl propene oxide. Useful and preferred epoxides are glycidyl esters of a carboxylic acid, which can be on a carboxylic acid functional polymer or preferably on a highly branched hydrophobic carboxylic acid like Cardura E10P (glycidyl ester of Versatic™ Acid 10). Most preferred are typical powder crosslinker epoxy components: triglycidyl isocyanurate (TGIC), Araldite PT910 and PT912, and phenolic glycidyl ethers that are solid in nature at ambient temperature.

Suitable examples of weak base C2 in embodiment LCC1 are weak base nucleophile anions chosen from the group carboxylate, phosphonate, sulphonate, halogenide or phenolate anions or salts thereof or a non-ionic nucleophile, preferably a tertiary amine and for catalyst system LCC according to embodiment I, C2 preferably is a weak base nucleophile anion chosen from the group carboxylate, halogenide or phenolate salts, most preferably carboxylate salts, or it is 1,4-diazabicyclo[2.2.2]octane (DABCO). Component C2 is able to react with the group C1, preferably epoxy, to yield a strongly basic anionic adduct which can in principle start the reaction of the crosslinkable components. Alternatively, it may react through its conjugated acid form, to produce a non-acidic adduct. Preferably, weak base group C2 has no substantial basicity towards the acidic C—H groups of crosslinkable component A but is reactive towards the epoxide at the low temperature crosslinking conditions (for example typically having a half-value of less than 30, preferably 15 minutes at the intended cure temperature).

Another suitable example of a weak base C2 is a weak base nucleophile anion selected from the group of weak base anion X- from an acidic X—H group containing compound wherein X is N, P, O, S or C, wherein anion X- is a Michael Addition donor reactable with activator C1 and anion X- is characterized by a pKa of the corresponding conjugate acid X—H of more than 1, preferably 1.5, more preferably 2 and even more preferably at least 3 units lower than the pKa of the acidic C—H groups of majority component A. These C2 components are specified as S2 for reaction with C═C acceptor groups S1 in embodiment LCC2, but can also act as nucleophile C2 in reaction with activator components C1 in embodiment LCC1, for example with epoxy, which can provide 2 pathways to react according to embodiment LCC1 and LCC2.

The group C2 preferably reacts with groups C1 at temperatures below 150° C., preferably 140, 130, 120 and preferably at least 70, preferably at least 80 or 90° C. on the time scale of the cure window. The reaction rate of group C2 with group C1 at the cure temperature is sufficiently low to provide a useful open time, and sufficiently high to allow sufficient cure in the intended time window.

The weak base C2, if an anion, is preferably added as a salt comprising a cation that is not acidic. Not acidic means not having a hydrogen that competes for base with component A, and thus not inhibiting the crosslinking reaction at the intended cure temperature. The cation preferably is substantially non-reactive towards any components in the crosslinkable composition. The cations can e.g. be alkali metals, quaternary ammonium or phosphonium but also protonated 'superbases' that are non-reactive towards any of the components A, B or C in the crosslinkable composition. Suitable superbases are known in the art.

Preferably the salt comprises alkali- or earth-alkali metal, in particular lithium, sodium or potassium cation or, preferably, a quaternary ammonium or phosphonium cation according to formula $Y(R')_4$, wherein Y represents N or P, and wherein each R' can be a same or different alkyl, aryl or aralkyl group possibly linked to a polymer or wherein the cation is a protonated very strong basic amine, which very strong basic amine is preferably selected from the group of amidines; preferably 1,8-diazabicyclo (5.4.0)undec-7-ene (DBU), or guanidines; preferably 1,1,3,3-tetramethylguanidine (TMG). R' can be substituted with substituents that do not or not substantially interfere with the RMA crosslinking chemistry as is known to the skilled person. Most preferably R' is an alkyl having 1 to 12, most preferably 1 to 4 carbon atoms.

EP0651023 describes a catalyst system for RMA crosslinkable solvent borne compositions comprising a catalyst C comprising quaternary ammonium or phosphonium salt of CI, Br, I, salicylate, a polybasic carboxylate, nitrate, a sulfonate, sulphate, sulphite, phosphate or an acid phosphate ester anion in combination with an epoxy compound.

Most preferably the powder coating composition comprises a catalyst system LCC further comprising acid C3 having a pKa of more than 1, preferably 1.5, more preferably 2 and even more preferably at least 3 units lower than the pKa of the acidic C—H groups of majority component A and wherein acid C3 preferably is a protonated C2. Preferably the acid C3 and the conjugated acid of C2 have a boiling point of at least 120° C., preferably 130° C., 150, 175, 200 or even 250° C. Preferably, C3 is a carboxylic acid.

A preferred catalyst system is catalyst system LCC1 which comprises epoxide groups C1, weak base nucleophilic anion groups C2 that react with the epoxide group C1 to form a strongly basic anionic adduct C1/2 and most preferably also acid groups C3. In a suitable catalyst system LCC1, C2 is a carboxylate salt and C1 is epoxide, carbodiimide, oxetane or oxazoline, more epoxide or carbodiimide or alternatively C2 is DABCO and C1 is epoxy.

Without wishing to be bound to theory it is believed that the nucleophilic anion C2 reacts with the activator epoxide C1 to give a strong base, but that this strong base is protonated by the acid C3 to create a salt (similar in function to C2) that will not directly strongly catalyse the crosslinking reaction. The reaction scheme takes place until substantially complete depletion of the acid C3, which provides for the open time because no significant amount of strong base is present during that time to significantly catalyse the reaction of the crosslinkable components. When the acid C3 is depleted strong base will be formed and survives to effectively catalyse the rapid RMA crosslinking reaction. Alternatively, the cycle may also work similarly when the activation reaction with C1 takes place with the protonated C2 species (C2 protonated as a result of the acid base equilibrium with component A); also, this scheme will lead to consumption of excess acid C3, and deprotonated A species being made available when the cycle progresses further.

The features and advantages of the invention will be appreciated upon reference to the following exemplary reaction scheme.

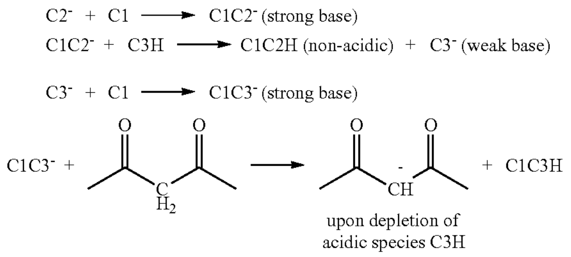

Specifically for the case of carboxylates, epoxides and carboxylic acids as C2, C1 and C3 species, this can be drawn up as:

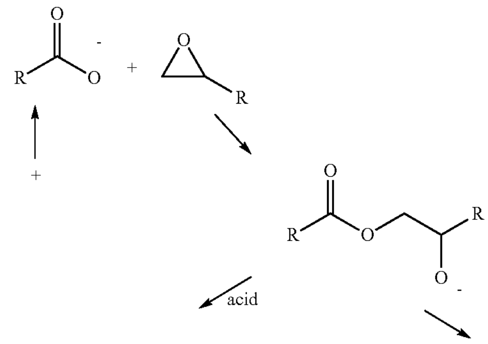

-continued

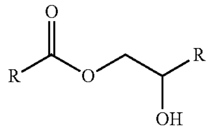

CATALYSIS

The reaction scheme, if the activator would react through the protonated form of C2, would be illustrated by the next scheme:

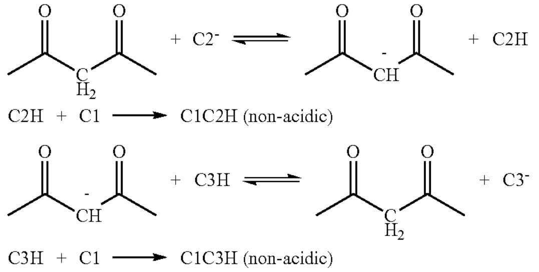

The open time can be tuned by the amount of acid (C3) and also by the choice of the amounts and reactivity of the reactants C1 and C2. The epoxide C1 must be available to start the reaction and it is preferred that the molar amount of epoxide is larger than the molar amount of acid C3.

In one embodiment acid group C3 is a protonated anion group C2, preferably carboxylic acid C3 and carboxylate C2, which for example can be formed by partially neutralising an acid functional component, preferably a polymer comprising acid groups C3 to partially convert to anionic groups C2, wherein the partial neutralizing is done preferably by a cation hydroxide preferably tetraalkylammonium or tetraalkylphosphonium hydroxide. In another embodiment, a polymer bound component C2 can be made by hydrolysis of an ester group in a polyester with aforementioned hydroxides.

Ethyl triphenyl-phosphonium acid acetate is known as a catalyst to crosslink epoxy functional polymers as described in "ETPPAAc Solutions Ethyl triphenyl-phosphonium Acid Acetate", 20 Apr. 2007, pages 1-2, XP055319211. It is not known to use this compound, as component C2 and C3 in RMA crosslinkable powder coating compositions. Furthermore, it is preferred that the boiling point of the component C3 and of the conjugate acid of C2 are above the envisaged curing temperature of the powder coating composition to prevent less well controlled evaporation of these catalyst system components during curing conditions. Formic acid and acetic acid are less preferred acids C3 as they may evaporate during curing. Preferably, for an LCC type system, component C3 and the conjugate acid of C2 have a boiling point higher than 120° C.

The catalyst system LCC1 preferably is a catalyst composition comprising individual components C1, C2 and optionally C3. This is most convenient for mixing with a particular combination of donor and acceptor polymers of choice. Alternatively, at least one of C1, C2 or C3 of the catalyst system LCC1 is a group on crosslinkable components A or B or both. In that case, if one or more but not all groups C1, C2 and C3 are on crosslinkable components A or B or both, the remaining component is added separately. In this case, typically and preferably both C2 and C3 are on a polymer and C1 is added separately or C1 and C3 are on a polymer and C2 is added separately. The advantage is the flexibility in optimising reactivity parameters by simply adjusting the catalyst composition. In a convenient embodiment both C2 and C3 are on crosslinkable polymer component A and/or B and C2 is preferably formed by partially neutralising an acid functional polymer comprising acid groups C3 with a base comprising a cation as described above to partially convert acid groups C3 to anionic groups C2. Another embodiment would have component C2 formed by hydrolysis of a polyester, e.g. of a polyester of component A, and be present as a polymeric species.

In an alternative embodiment the powder coating composition comprises a latent catalytic system LCC2, wherein weak base C2 is selected from the group of phosphines, N-alkylimidazoles, fluorides and a weak base anion X- from an acidic X—H group containing compound wherein X is N, P, O, S or C, wherein anion X- is a Michael Addition donor reactable with activator S1 and anion X- is characterized by a pKa of the corresponding conjugate acid X—H of more than 1, preferably 1.5, more preferably 2 and even more preferably at least 3 units lower than the pKa of the acidic C—H groups of the majority component A. In this embodiment the reaction of weak base C2 with an unsaturated group with Michael acceptor characteristics (S1, which may be equal to B, but can also be another Michael Addition acceptor species) triggers the generation of more catalytically active strong basic species to accelerate the reaction between components A and B.

In yet another embodiment the powder coating comprises the latent catalyst system is a latent catalyst system LCE having evaporative latency, wherein the reaction is delayed by a slow evaporation step of an acidic species. In this embodiment comprising 1) a base , preferably a strong base, blocked with a volatile acid or alternatively 2) comprising a weak base C2 which on protonation by the excess of weakly acidic species A forms a volatile acid and wherein the latent catalyst system optionally further comprises additional volatile acid C3, which volatile acids evaporate at the curing temperature Tcur, wherein the boiling point of the acid is below 300° C., preferably below 250° C., 225, 200 or 150° C. and preferably above 100° C. or 120° C. Quaternary ammonium or phosphonium salts of carboxylic acids having a boiling point as specified above are preferred.

The powder coating composition preferably comprises a. In case of catalyst system LCC1, an activator C1 in an amount between 1 and 600 μeq/gr, preferably between 10 and 400, more preferably between 20 and 200 μeq/gr, wherein μeq/gr is μeq relative to total weight of binder components A and B and catalyst system LCC or, in case of catalyst system LCC2, an activator S1 in an amount of at least 1 μeq/gr, preferably at least 10, more preferably at least 20, most preferably at least 40 μeq/gr,
b. weak base C2 in an amount between 1 and 300 μeq/gr, preferably between 10 and 200, more preferably between 20 and 100 μeq/gr relative to total weight of binder components A and B and catalyst system LC,
c. optionally an acid C3 in an amount between 1 and 500, preferably between 10 and 400, more preferably between 20 and 300 μeq/gr and most preferably between 30 and 200 μeq/gr,
d. wherein preferably the amount of C1 or respectively S1
    i. is higher than the amount of C3, preferably by an amount between 1 and 300 μeq/gr, preferably between 10 and 200, more preferably between 20 and 100 μeq/gr and ii. is preferably higher than the amount of C2 and
iii. is preferably higher than the sum of the amount of C2 and C3.

In case of catalyst system LCC2 for S1 there is no relevant upper limit in concentration as S1 may be also be component B. The catalyst also works with the amount of C1 being lower than of C2. However, this is less preferred as it may be a waste of C2. In case the amount of C1, in particular epoxide, is higher than the amount of C2 the drawbacks are limited as it may react with C2 and C3 or other nucleophilic remains, but still maintain basicity after reaction or it may be left in the network, without too much problems. Nevertheless, excess of C1 may be disadvantageous in view of cost for C1 other than epoxy. It is noted that a combination of LCC1 and LCE embodiments is possible, in which case C2 may be higher than C1 if C2 is also forming an evaporative acid and thus is also driving the catalysis as an LCE type catalyst. Further, in case acid C3 is a volatile acid it provides additional initial latency by evaporating of the retarding acid C3. This is a combination of latent catalyst system LCC and LCE. In that case, above the requirement d.i does not apply.

Further it is preferred that in the powder coating composition a. the weak base C2 represents between 10 and 100 mol % of the sum of C2 and C3,
b. preferably the amount of acid C3 is 20-400 mol %, preferably 30-300 mol % of the amount of C2,
c. wherein preferably the ratio of the molar amount of C1 to the sum of the amount of C2 and C3 is at least 0.5, preferably at least 0.8, more preferably at least 1 and preferably at most 3, more preferably at most 2,
d. the ratio of C1 to C3 is preferably at least 1, preferably at least 1.5, most preferably at least 2.

In an alternative embodiment the powder coating composition comprises a latent catalyst system LCP having physical latency wherein a catalytic system, preferably a strong base or a latent catalyst system, is present which is physically separated and inaccessible for chemical reaction in the powder at or below a compounding temperature Tcomp and which is accessible for chemical reaction at the curing temperature, preferably chosen from a) a latent catalyst system LCP1 comprising a catalyst having a melting temperature below the curing temperature and above the compounding temperature, preferably above 70, 80, 90 or 100° C. or
b) a latent catalyst system LCP2 comprising an active catalyst species which is encapsulated in- or mixed with- a material which releases the catalyst at a temperature below the curing temperature and above the compounding temperature wherein preferably the material has a melting temperature or, in case of an amorphous material a glass transition temperature, below the curing temperature and above the compounding temperature, or
c) a latent catalyst system LCP3 comprising a photo-based generator component that releases a base upon irradiation with an appropriate wavelength, It is noted that combinations of catalyst systems LCC, LCE and LCP are possible.

EP1813630 describes encapsulated base catalysts an processes for the preparation thereof for RMA crosslinkable adhesives which are enclosed herein by reference. The capsules can be made of base catalysts using paraffin and microcrystalline waxes to provide a shell or matrix. EP6224793 discloses an encapsulated active agent comprising an active agent encapsulated in a crystallisable or thermoplastic polymer. The melting or glass temperature of the encapsulation is herein chosen between Tcomp and Tcur.

In alternative embodiment LCP3, the latency of the catalyst system for high temperature curing RMA curing powder coatings can be provided by photo-based generator components (PBGs) that release a base upon irradiation with an appropriate wavelength. The generated base are preferably a strong base, i.e. strong enough to catalyse the RMA reaction between A and B or can be a weak base that is used as a component C2 in combination with an LCC chemically latent catalytic system. PBGs for Michael Addition reactive systems are described e.g. in EP3395800, in Progr. Org. Coat. (2019) 127, 222-230, in Polymer (2017) 113 193-199, in React. Funct. Polym. (2018) 122 60-67. Photobase generators offer similar high levels of control of reactivity as radical photo-initiators; they also face similar complications as potential problems with uniform irradiation of complexly shaped substrates, radiation penetration issues with pigmented coatings, and dedicated expensive setup requirements. PBG's described herein can be used if the generated base has the required pKa values and nucleophilicity for the envisaged latent catalyst system. Preferably high basicity species are generated such as an amidine, guanidine, or carbanion.

The powder coating composition with RMA crosslinkable components A and B and latent catalyst system LC, preferably catalyst system LCC and most preferably catalyst system LCC1, as described above allows for curing temperatures as targeted, being low curing temperatures compared to competitive powder systems. The low curing temperatures generally range between 75 and 150° C., preferably 80-130° C., more preferably 80-120° C. or 80-110° C., the cure temperature is chosen within that range e.g. in view of the temperature sensitivity of the substrates. The curing time depends on the chosen curing temperature. The curing time is the time during which heat is applied at the curing temperature, for example in an oven, to achieve sufficient curing before being cooled down to room temperature. Within the indicated curing temperature ranges, this curing time typically ranges between 1 or 2 and 50, preferably between 2 or 5 and 40 and usually and most preferably between 5 or 10 and 30 minutes. The curing can take place in an oven and may also, preferably, be assisted by infrared radiative heating.

The powder coating composition according to the invention preferably has a kinetic curing profile, as can be determined by FTIR measuring the conversion of the unsaturated bonds C═C of component B as a function of time a curing temperature chosen between 80, 90, 100 and 200, 150, 135 or 120° C., wherein the ratio of the time to go from 20% to 60% C═C conversion to the time to reach 20% conversion (as determined by FTIR) is less than 1, preferably less than 0.8, 0.6, 0.4 or 0.3, preferably with the time to reach 60% conversion being less than 30 or 20 or 10 min. Preferably, the powder paint has a kinetic cure profile such that the time to reach 20% conversion at 100° C. is at least 1 minute, preferably at least 2, 3, 5, 8 or 12 minutes. The curing profile is set by choice of the components of the catalytic system for the chosen combination of reactants A and B and the curing temperature.

The powder coating process involves heating of substrates to the curing temperature which involves significant energy cost. The coating process using the powder coating composition of the invention is more energy efficient as it operates at low temperatures, while allowing sufficient cure preferably within 50, 30, 20 or even 15) minutes curing time and with as long an open time of the applied coating film (pre-gelation) as possible. The composition is preferably characterised by a sigmoidal curing profile with an onset providing an initial period of maximum fluidity and low reaction conversion (open time), followed by a steep increase to warrant sufficient final conversion within limited curing times. The long open time provides for maximizing flow before gelation, which benefits the development of a good coating appearance. Apart from the coating properties the powder coating composition can be especially advantageous for use in low temperature cure powder, where due to the catalyst system's kinetic profile a premature crosslinking- or molecular weight and viscosity increasing reaction, during compounding and mixing of the components in the extruder, is limited.

The powder coating composition according to the invention is further preferably characterised in that a. crosslinkable component A comprises at least 2 acidic C—H donor groups in activated methylene or methine in a structure Z1(—C(—H)(—R)—)Z2 wherein R is hydrogen, a hydrocarbon, an oligomer or a polymer, and wherein Z1 and Z2 are the same or different electron-withdrawing groups, preferably chosen from keto, ester or cyano or aryl groups, and preferably comprises an activated C—H derivative having a structure according to formula 1:

Formula 1

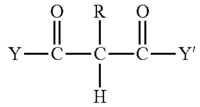

wherein R is hydrogen or an optionally substituted alkyl or aryl and Y and Y' are identical or different substituent groups, preferably alkyl, aralkyl or aryl , or alkoxy or wherein in formula 1 the —C(═O)—Y and/or —C(═O)—Y' is replaced by CN or aryl, no more than one aryl or wherein Y or Y' can be NRR' (R and R' are H or optionally substituted alkyl) but preferably not both, wherein R, Y or Y' optionally provide connection to an oligomer or polymer, said component A preferably being malonate, acetoacetate, malonamide, acetoacetamide or cyanoacetate groups, preferably providing at least 50, preferably 60, 70 or even 80% of the total of C—H acidic groups in crosslinkable component A, b. Component B comprising the at least 2 activated unsaturated RMA acceptor groups preferably originate from acryloyl, methacryloyl, itaconates, maleate or fumarate functional groups, wherein preferably at least one, more preferably both, of components A or B is a polymer and wherein preferably the composition comprises a total amount donor groups C—H and acceptor groups C═C per gram binder solids from 0.05 to 6 meq/gr binder solids and preferably the ratio of acceptor groups C═C to donor groups C—H is more than 0.1 and less than 10.

Real Michael Addition (RMA) crosslinkable coating compositions comprising crosslinkable components A and B are generally described for use in solvent borne systems in EP2556108, EP0808860 or EP1593727 which specific description for crosslinkable components A and B are herewith considered to be enclosed.

The components A and B respectively comprise the RMA reactive donor and acceptor moieties which on curing react to form the crosslinked network in the coating. The components A and B can be present on separate molecules but can also be present on one molecule, referred to as a hybrid A/B component, or combinations thereof. Preferably, components A and B are separate molecules and each independently in the form of polymers, oligomers, dimers or monomers. For coating applications, it is preferred at least one of component A or B preferably are oligomers or polymers. It is noted that an activated methylene group CH2 comprises 2 C—H acidic groups. Even though, after reaction of the first C—H acidic group, the reaction of the second C—H acid group is more difficult, e.g. for reaction with methacrylates, as compared to acrylates, the functionality of such activated methylene group is counted as 2. The reactive components A and B can also be combined in one A/B hybrid molecule. In this embodiment of the powder coating composition both C—H and C═C reactive groups are present in one A-B molecule.

It is envisaged that one or more components of the catalyst system C can also be combined in one molecule optionally in combination with component A and/or B although that component should not be an active catalyst component or a combination of two components that can form the catalytic active component to prevent premature reaction at the synthesis, formulation and powder formation stage. For example, the polymer can comprise groups C1, C2 and/or C3, but not the combination C1 and C2. From the perspective of flexibility in formulating the composition, the components of catalyst system C most preferably are added as separate components.

Preferably, component A is a polymer, preferably a polyester, polyurethane, acrylic, epoxy or polycarbonate, having as a functional group a component A and optionally one or more components B, or components from catalytic system C. Also, mixtures or hybrids of these polymer types are possible. Suitably component A is a polymer chosen from the group of acrylic, polyester, polyester amide, polyesterurethane polymers.

Malonates or acetoacetates are preferred donor types in component A. In view of high reactivity and durability in a most preferred embodiment of the crosslinkable composition, component A is a malonate C—H containing compound. It is preferred that in the powder coating composition the majority of the activated C—H groups are from malonate, that is more than 50%, preferably more than 60%, more preferably more than 70%, most preferably more than 80% of all activated C—H groups in the powder coating composition are from malonate.

The advantages of the invention are particularly manifest in critically difficult compositions, with relative high concentrations and functionalities of functional groups, for example in case the component A is a compound, in particular an oligomer or polymer, comprising an average of 2 to 30, preferably 3 to 20 and more preferably 4-10 activated C—H per polymer chain. Preferred are oligomeric and/or polymeric malonate group-containing components such as, for example, polyesters, polyurethanes, polyacrylates, epoxy resins, polyamides and polyvinyl resins or hybrids thereof containing malonate type groups in the main chain, pendant or both.

The total amount of donor groups C—H and acceptor groups C═C per gram binder solids, independent of how they are distributed over the various crosslinkable components, is preferably between 0.05 to 6 meq/gr, more typically 0.10 to 4 meq/gr, even more preferably 0.25 to 3 meq/gr binder solids, most preferably between 0.5 to 2 meq/gr. Preferably, the stoichiometry between components A and B is chosen such that the ratio of reactive C═C groups to reactive C—H groups is more than 0.1, preferably more than 0.2, more preferably more than 0.3, most preferably more than 0.4, and, in the case of acrylate functional groups B preferably more than 0.5 and most preferably more than 0.75, and the ratio is preferably less than 10, preferably 5, more preferably less than 3, 2 or 1.5.

The malonate group-containing polyesters can be obtained preferably by the transesterification of a methyl or ethyl diester of malonic acid, with multifunctional alcohols that can be of a polymeric or oligomeric nature but can also be incorporated through a Michael Addition reaction with other components. Especially preferred malonate group-containing components for use with the present invention are the malonate group-containing oligomeric or polymeric esters, ethers, urethanes and epoxy esters and hybrids thereof, for example polyester-urethanes, containing 1-50, more preferably 2-10, malonate groups per molecule. Polymer components A can also be made in a known manner, for example by radical polymerisation of ethylenically unsaturated monomers comprising monomers, for example (meth) acrylate, functionalised with a moiety comprising activated C—H acid (donor) groups, preferably an acetoacetate or malonate group, in particular 2-(methacryloyloxy)ethyl acetoacetate or -malonate. In practice polyesters, polyamides and polyurethanes (and hybrids of these) are preferred. It is also preferred that such malonate group containing components have a number average molecular weight (Mn) in the range of from about 100 to about 10000, preferably 500-5000, most preferably 1000-4000; and a Mw less than 20000, preferably less than 10000, most preferably less than 6000 (expressed in GPC polystyrene equivalents).

Suitable crosslinkable components B generally can be ethylenically unsaturated components in which the carbon-carbon double bond is activated by an electron-withdrawing group, e.g. a carbonyl group in the alpha -position. Representative examples of such components are disclosed in U.S. Pat. No. 2,759,913 (column 6, line 35 through column 7, line 45), DE-PS-835809 (column 3, lines 16-41), U.S. Pat. No. 4,871,822 (column 2, line 14 through column 4, line 14), U.S. Pat. No. 4,602,061 (column 3, line 14 20 through column 4, line 14), U.S. Pat. No. 4,408,018 (column 2, lines 19-68) and U.S. Pat. No. 4,217,396 (column 1, line 60 through column 2, line 64).

Acrylates, methacrylates, itaconates, fumarates and maleates are preferred. Itaconates, fumarates and maleates can be incorporated in the backbone of a polyester or polyester-urethane. Preferred example resins such as polyesters, polycarbonates, polyurethanes, polyamides, acrylics and epoxy resins (or hybrids thereof) polyethers and/or alkyd resins containing activated unsaturated groups may be mentioned. These include, for example, urethane (meth) acrylates obtained by reaction of a polyisocyanate with an hydroxyl group containing (meth)acrylic ester, e.g., an hydroxy-alkyl ester of (meth)acrylic acid or a component prepared by esterification of a poly-hydroxyl component with less than a stoichiometric amount of (meth)acrylic acid; polyether (meth)acrylates obtained by esterification of an hydroxyl group-containing polyether with (meth)acrylic acid; poly-functional (meth)acrylates obtained by reaction of an hydroxy-alkyl (meth)acrylate with a poly-carboxylic acid and/or a poly-amino resin; poly(meth)acrylates obtained by reaction of (meth)acrylic acid with an epoxy resin, and poly-alkyl maleates obtained by reaction of a mono-alkyl maleate ester with an epoxy resin and/or an hydroxy functional oligomer or polymer. Also, polyesters end-capped with glycidyl methacrylate are a preferred example. It is possible that the acceptor component contains multiple types of acceptor functional groups.

Most preferred activated unsaturated group-containing components B are the unsaturated acryloyl, methacryloyl and fumarate functional components. Preferably the number average functionality of activated C═C groups per molecule is 2-20, more preferably 2-10, most preferably 3-6. The equivalent weight (EQW: average molecular weight per reactive functional group) is 100-5000, more preferable 200-2000, and the number average molecular weight preferably is Mn 200-10000, more preferable 300-5000, most preferably 400-3500 g/mole, even more preferably 1000-3000 g/mole.

In view of the use in powder systems the Tg of component B is preferably above 25, 30, 35, more preferably at least 40, 45, most preferably at least 50° C. or even at least 60° C., because of the need for powder stability. The Tg is defined as measured with DSC, mid-point, heating rate 10° C./min. If one of the components has a Tg substantially higher than 50° C., the Tg of the other components can be lower as will be understood by those skilled in the art.

A suitable component B is a urethane (meth)acrylate which has been prepared by reacting a hydroxy- and (meth) acrylate functional compound with isocyanate to form urethane bonds, wherein the isocyanates are preferably at least in part di- or tri-isocyanates, preferably isophorone diisocyanate (IPDI). The urethane bonds introduce stiffness on their own but preferably high Tg isocyanates are used like cyclo-aliphatic or aromatic isocyanates, preferably cycloaliphatic. The amount of such isocyanates used is preferably chosen such that said (meth)acrylate functional polymer Tg is raised above 40, preferably above 45 or 50° C.

The powder coating composition is designed preferably in such a way, that after cure, a crosslink density (using DMTA, as described below) can be determined of at least 0.025 mmole/cc, more preferably at least 0.05 mmole/cc, most preferably at least 0.08 mmole/cc. and typically less than 3, 2, 1 or 0.7 mmole/cc.

The powder coating composition should retain free flowing powder at ambient conditions and therefore preferably has a Tg above 25° C., preferably above 30° C., more preferably above 35, 40, 50° C. as the midpoint value determined by DSC at a heating rate of 10° C./min.

As described above the preferred component A is a malonate functional component. However, incorporation of malonate moieties tends to reduce the Tg and it has been a challenge to provide powder coating compositions based on malonate as the dominant component A with sufficiently high Tg.

In view of achieving high Tg, the powder coating composition preferably comprises a crosslinkable component A, a component B or a hybrid component A/B comprising amide, urea or urethane bonds and/or comprise high Tg monomers, preferably cycloaliphatic or aromatic monomers or in case of polyesters, one or more monomers chosen from the group of 1,4-dimethylol cyclohexane (CHDM), tricyclodecanedimethanol (TCD diol), isosorbide, penta-spiroglycol, hydrogenated bisphenol A and tetra-methyl-cyclobutanediol.

Further, in view of achieving high Tg, the powder coating composition comprises component B or hybrid component A/B being a polyester (meth-)acrylate, a polyester urethane (meth-)acrylate, an epoxy (meth-)acrylate or a urethane (meth-)acrylate, or is a polyester comprising fumarate, maleate or itaconate units, preferably fumarate or is a polyester end-capped with isocyanate or epoxy functional activated unsaturated group.

The abovementioned measures to achieve high Tg in crosslinkable components A or B or hybrid A/B can advantageously be combined with the presence of crystalline components. The components in the powder coating composition can be amorphous or crystalline. In case the components in the composition are fully amorphous, the Tg of these components must be sufficiently high, but that may be difficult to achieve in combination with a low melt viscosity at low temperatures. Therefore, it may be preferred that the powder coating composition comprises one or more components, preferably crosslinkable components A or B or hybrid A/B or components of catalyst system C or separate different plasticizers that are in a (semi-)crystalline state in the powder coating composition and have a melting temperature between 40 and 150° C., preferably 50 to 130° C., more preferably 60 or 70 to 120° C., more preferably 60 to 110° C. Preferably, one or more components A or B or components of catalyst system C, are (semi-) crystalline or a mixture of amorphous and (semi-) crystalline components, but the crystalline components may also be additives without additional role in the crosslinking reaction. Crystalline components preferably have a Tg when molten below 50° C. or more preferably below 30, 20 or even 10° C. and a Tm, when crystallized in the paint composition, in the range as indicated. The crystalline components have a lower melt viscosity when molten, but do not decrease Tg, when in the crystalline state. An advantage of (semi-)crystalline polymer is that a higher Tg of the composition can be achieved, in combination with a lower melt viscosity at the cure temperature due to the plastization effect upon melting. The amount of the crystalline components is chosen together with other Tg influencing parameters to get a right balance of melt viscosity at the envisaged curing temperature of less than 60 Pas, more preferably less than 50, 40, 30, 20, 10 or even 5 Pas and a powder paint Tg preferably above 35° C. Care must be taken in the preparation process that crystallisable components are in crystalline state in the powder paint as used.

Most preferably the powder coating composition comprises an RMA crosslinkable polymer in accordance with another aspect of the invention, which has features adapted for use in an RMA crosslinkable powder coating composition. In particular in view of achieving good flow and levelling properties, and good chemical and mechanical resistances, it was found that preferably in the powder coating composition at least one of crosslinkable components A or B or hybrid A/B is a polymer, preferably chosen from the group of acrylic, polyester, polyester amide, polyester-urethane polymers, which polymer a) has a number average molecular weight Mn, as determined with GPC, of at least 450 gr/mole, preferably at least 1000, more preferably at least 1500 and most preferably at least 2000 gr/mole,
b) has a weight average molecular weight Mw, as determined with GPC, of at most 20000 gr/mole, preferably at most 15000, more preferably at most 10000 and most preferably at most 7500 gr/mole,
c) preferably has a molecular weight distribution Mw/Mn below 4, more preferably below 3, and evidently above 1
d) has an equivalent weight EQW in C—H or C=C of at least 150, 250, 350, 450 or 550 gr/mole and preferably at most 2500, 2000, 1500, 1250 or 1000 gr/mole and a number average functionality of reactive groups C—H or C=C between 1-25, more preferably 1.5-15 even more preferably 2-15, most preferably 2.5-10 C—H groups per molecule,
e) preferably has a melt viscosity at a temperature in the range between 100 and 140° C. less than 60 Pas, more preferably less than 40, 30, 20, 10 or even 5 Pas
f) preferably comprises amide, urea or urethane bonds and/or comprises high Tg monomers, preferably cycloaliphatic or aromatic monomers, in particular polyester monomers chosen from the group of 1,4-dimethylol cyclohexane (CHDM), tricyclodecanedimethanol (TCD diol), isosorbide, penta-spiroglycol or hydrogenated bisphenol A and tetramethyl-cyclobutanediol,
g) has a Tg above 25° C., preferably above 35° C., more preferably above 40, 50 or even 60° C. as as the midpoint value determined by DSC at a heating rate of 10° C./min or is a crystalline polymer with a melting temperature between 40° C. and 150, preferably 130° C., preferably at least 50 or even 70° C. and preferably lower than 150, 130 or even 120° C. (as determined by DSC at a heating rate of 10° C./min).

It can be noted that RMA is also used to prepare coating starting from liquid (non powder) compositions. For example, WO2016166371 describes RMA crosslinkable coating compositions, using a catalyst system based on a carbon dioxide blocked strong base catalyst, a reactive component A, for example a malonated polyester, and a reactive component B.

The polymer features Mn, Mw and Mw/Mn are chosen in view of on one hand the desired powder stability and on the other hand the desired low melt viscosity, but also the envisaged coating properties. A high Mn is preferred to minimize Tg reduction effects of end groups, on the other hand low Mw's are preferred because melt viscosity is very much related to Mw and a low viscosity is desired; therefore low Mw/Mn is preferred.

In view of achieving high Tg the RMA crosslinkable polymer preferably comprises amide, urea or urethane bonds and/or comprising high Tg monomers, preferably cycloaliphatic or aromatic monomers, or in case of polyesters comprises monomers chosen from the group of 1,4-dimethylol cyclohexane (CHDM), TCD diol, isosorbide, pentaspiroglycol or hydrogenated bisphenol A and tetramethylcyclobutanediol.

In case the RMA crosslinkable polymer is an A/B hybrid polymer it is further preferred that the polymer also comprises one or more component B groups chosen from the group of acrylate or methacrylate, fumarate, maleate and itaconate, preferably (meth)acrylate or fumarate. Further, if to be used as crystalline material, it is preferred that the RMA crosslinkable polymer has crystallinity with a melting temperature between 40° C. and 130° C., preferably at least 50 or even 70° C. and preferably lower than 150, 130 or even 120° C. (as determined by DSC at a heating rate of 10° C./min) It is noted that this is the melting temperature of the (pure) polymer itself and not of the polymer in a blend In a preferred embodiment the RMA crosslinkable polymer comprising polyester, polyester amide, polyester-urethane or a urethane-acrylate which comprises urea, urethane or amide bonds derived from cycloaliphatic or aromatic isocyanates, preferably cycloaliphatic isocyanates, said polymer having a Tg of at least 40° C., preferably at least 45 or 50° C. and at most 120° C. and a number average molecular weight Mn of 450-10000, preferably 1000-3500 gr/mole and preferably a maximum Mw of 20000, 10000 or 6000 gr/mole and which polymer is provided with RMA crosslinkable components A or B or both. The polymer is obtainable for example by reacting a precursor polymer comprising said RMA crosslinkable groups with an amount of cycloaliphatic or aromatic isocyanates to increase the Tg. The amount of such isocyanates added, or urea/urethane bonds formed, is chosen such the Tg is raised to at least 40° C., preferably at least 45 or 50° C.

Preferably, the RMA crosslinkable polymer is a polyester or polyester-urethane comprising a malonate as the dominant component A and comprising a number average malonate functionality of between 1-25, more preferably 1.5-15 even more preferably 2-15, most preferably 2.5-10 malonate groups per molecule, has a GPC weight average molecular weight between 500 and 20000, preferably 1000-10000, most preferably 2000-6000 gr/mole, which has been prepared by reacting a hydroxy- and malonate functional polymer with isocyanate to form urethane bonds.

Further, the polymer can be an amorphous or (semi-) crystalline polymer or a mixture thereof. Semi-crystalline means being partly crystalline and partly amorphous. (Semi)-crystallinity is to be defined by DSC melting endotherms, targeted crystallinity defined as having a DSC peak melting temperature Tm at least 40° C., preferably at least 50° C., more preferably at least 60° C. and preferably at most 130, 120, 110 or 100° C. The DSC Tg of such a component in fully amorphous state preferably is below 40° C., more preferably below 30, 20 or even 10° C.

In view of improving the shelf life of the powder coating composition, it was found to be advantageous to use polymer-bound C2 and C3 functionalities, in particular a polymer comprising carboxylate and optionally also carboxylic acid components C2 and C3. It is believed that shelf life is improved by reduced mobility and Tg impact. An additional advantage is that polymer components with high EQWs compared to low EQW components are more easily mixed into the powder coating composition, for example when formulations are prepared in an extruder, and risk for inhomogeneities is reduced.

The invention thus also relates to a polymer (C3/2 polymer) and its use as a latent base catalyst component in RMA crosslinkable coating compositions, said polymer comprising a weak base groups C2 and optionally acid groups C3, wherein weak base groups C2 are preferably formed by partially or fully neutralizing acid groups C3 on the polymer, wherein C2 and C3 are preferably carboxylate and carboxylic acid groups, wherein the polymer is preferably chosen from the group of acrylic, polyester, polyester-amide and polyester-urethane polymers, wherein the polymer optionally comprises C—H donor groups, C═C acceptor groups or both, wherein the polymer preferably has a) an acid value in non-neutralized form of at least 3, more preferably 5, 7, 10, 15 or even 20 mg KOH/g, and preferably less than 100, 80, 70, 60 mg KOH/g,
b) a quaternary ammonium or phosphonium cation, preferably a tetrabutyl- or ethylammonium cation
c) an Mn at least 500, preferably at least 1000 or even 2000, and Mw no more than 20,000, preferably no more than 10,000 or 6000,
d) in case C—H donor and/or C═C acceptor groups are present; a reactive C—H donor or C═C acceptor equivalent weight of at least 150, preferably at least 250, 350 or even 450 g/mol and no more than 2000, preferably no more than 1500, 1200 or 1000 g/mol,
e) in case no C—H donor and C═C acceptor groups are present an acid value in non-neutralized form of at least 10, more preferably 15, 20 mg KOH/g, and preferably less than 100, 80, 70, 60 mg KOH/g.

Preferably, the donor CH-groups are malonate type functionalities. The acceptor unsaturated groups are preferably acrylate, methacrylate, fumarate, maleate or itaconate groups. It is further preferred that the above described C3/2 polymer has high Tg or crystallinity as specified above for the RMA crosslinkable polymer by comprising high Tg monomer components and/or stiff bonds.

The invention also relates to the use of the RMA crosslinkable polymer in RMA crosslinkable powder coatings. The invention further relates to a method for the preparation of a powder coating composition comprising the step of a. Providing component A, component B, catalyst system C and optional additives,
b. Extruding the components, preferably at a temperature Tcomp below 140° C., more preferably below 120, 100, 90 or even below 80° C.
c. Cooling,
d. shaping the extruded mixture to form a granulate, before, during or after cooling.
e. Optionally adding further additives
f. Grinding the granulate to powder.

The optionally added coating additives typically are one or more additives selected from the group of pigments, dyes, dispersants, degassing aids, levelling additives, matting additives, flame retarding additives, additives for improving film forming properties, for optical appearance of the coating, for improving mechanical properties, adhesion or for stability properties like colour and UV stability.

Powder paints can also be designed to produce matte coatings, using similar avenues as in conventional powder coatings systems, either relying on additives or through intentional inhomogeneous crosslinking using either powder blend systems or systems based on blends of polymers of different reactivity.

Standard powder coating processing can be used, typically involving solidifying the extrudate immediately after it leaves the extruder by force-spreading the extrudate onto a cooling band. The extruded paint can take the form of a solidified sheet as it travels along the cooling band. At the end of the band, the sheet is then broken up into small pieces, preferably via a peg breaker, to a granulate. At this point, there is no significant shape control applied to the granules, although a statistical maximum size is preferred. The paint granulate is then transferred to a classifying microniser, where the paint is milled to very precise particle size distribution. This product is then the finished powder coating paint. In case crystalline components are used care must be taken that the crystallisable components are present in the crystalline state in the powder paint. This may for example imply choosing Tcomp below the melting temperatures Tm of the crystallisable components or in case of Tcomp is above Tm to allow the components to crystallise on cooling.

The invention also relates to a method for powder-coating a substrate comprising a. Providing a powder having the powder coating composition according to the invention or as obtained in a process as described above,
b. Applying a layer of the powder to a substrate surface and
c. Heating to a curing temperature Tcur between 75 and 200° C., preferably between 80 and 180° C. and more preferably between 80 and 160, 150, 140, 130 or even 120° C., optionally and preferably using infrared heating,
d. and curing at Tcur for a curing time preferably less than 40, 30, 20,15, 10 or even 5 minutes.

In the method the curing at Tcur is preferably characterised by a curing profile, as determined by measuring the conversion of the unsaturated bonds C═C of component B as a function of time by FTIR wherein the ratio of the time to go from 20% to 60% C═C conversion to the time to reach 20% conversion is less than 1, preferably less than 0.8, 0.6, 0.4 or 0.3, preferably with the time to reach 60% conversion being less than 30 or 20 or 10 min and the powder coating composition at the Tcur preferably has a melt viscosity at the curing temperature less than 60 Pas, more preferably less than 40, 30, 20, 10 or even 5 Pas. The melt viscosity is to be measured at the very onset of the reaction or without C2 of the catalysis system.

In a preferred embodiment of the method the curing temperature is between 75 and 140° C., preferably between 80 and 120° C. and the catalyst system C is a latent catalyst system as described above which allows for powder coating a temperature sensitive substrate, preferably MDF, wood, plastic or temperature sensitive metal substrates like alloys.

Therefore, the invention also relates to articles coated with a powder coating composition of the invention, preferably having a temperature sensitive substrate like MDF, wood, plastic or metal alloys and wherein preferably the crosslinking density XLD of the coating is at least 0.01, preferably at least 0.02, 0.04, 0.07 or even 0.1 mmole/cc (as determined by DMTA) and is preferably lower than 3, 2, 1.5, 1 or even 0.7 mmole/cc.

The invention also relates to the use of a catalyst system C as described above for catalysing the crosslinking reaction in RMA crosslinkable powder coatings compositions at curing temperatures below 200° C., preferably below 180° C., more preferably below 160, 140, or even 120° C.

The invention relates to powder coating compositions suitable for low temperature powder coating crosslinking typically at curing temperature is between 75 and 140° C. which can be used for powder coating temperature-sensitive substrates like MDF, wood, plastic or temperature sensitive metal alloys. The powder coating compositions comprise a crosslinkable component A having at least 2 acidic C—H donor groups in activated methylene or methine, a crosslinkable component B having at least 2 activated unsaturated acceptor groups C═C which react with component A by Real Michael Addition under the action of a catalyst system C that is preferably a latent catalyst system. The invention also relates to a process for the manufacture of such powder coating compositions, to processes for coating articles using said powder coating composition and resulting coated articles.

The invention also relates to specific polymers for use in the powder coatings and to the use of specific catalyst systems in such powder coating compositions.

The invention will be illustrated by the following examples.

TEST METHODS

Molar mass distribution of polymers was determined with Gel Permeation Chromatography (GPC) on Perkin-Elmer HPLC series 200 equipment, using refractive index (RI) detector and PLgel column, using as eluens THF, using calibration by polystyrene standards. Experimental molecular weights are expressed as polystyrene equivalents.

Resin and paint glass transition temperatures reported herein are the mid-point Tg's determined from Differential Scanning Calorimetry (DSC) using a heating rate of 10° C./min. Melting points are also determined with DSC using the same scan rate. For determining reaction heat evolved versus time, DSC is used in an isothermal mode, after a rapid heating (60° C./min) to the cure temperature to be studied.

The XLD was measured by DTMA measurement on a free-standing coating film prepared by applying the powder coating composition on PTFE coated panels and cured according to the chosen cure profile. The cured coating can readily be peeled off the panel to produce a free-standing film of coating. From the free-standing film a sample was cut for DMTA measurements of 3 mm width and 30 mm length. The length between the clamps of the tensile bench of the DMTA was 30 mm. A DMTA measurement was performed at 11 Hz and a heating rate of 5° C./min, from which the cross-link density parameter XLD (in mmole/cc) was evaluated as known in the art. The cross-link density parameter XLD was determined following the general procedure as described in detail in ASTM manual MNL17-2ND (Dynamic Mechanical and Tensile Properties, published 2012) using free-standing coating films measured in tensile mode on a modified Rheovibron (Toyo Baldwin type DDV-II-C) DMTA apparatus at a frequency of 11 Hz with a dynamic tensile strength of 0.03%. All measurements are done in the tensile mode and at each temperature the tensile storage modulus E', the tensile loss modulus E", and tanδ (tanδ=E"/E') are determined. DMTA is run on a free-standing cured coating of a layer thickness of about 30 to 50 μm prepared on a non-adhering substrate. For unfilled coatings, cross-link density can be directly calculated from the minimum tensile storage modulus E'min and the temperature Tmin (in Kelvin) at which this minimum in modulus E'min is found:

$$v_e = \frac{E'_{min}}{3RT_{min}}$$

where R is the gas constant (8.314 J/mol/K) and ve is the cross-link density (=number of moles of elastically effective network chains per volume). Film Tg can be determined from the DMTA curve either as associated with the maximum of tan δ, or as the value associated with maximum E".

Gel Times: a Coesfeld Material gel tester is used to determine the gel time. Prior to testing, the gel tester is set to the required temperature, and allowed to stabilize. A controlled amount of the ground powder is placed into the gel tester hot plate and the timer is started. As the sample starts to melt, the material is compounded with a wooden cocktail stick using a circular motion. As the sample reacts, the viscosity rises until a point is reached when the material ceases to be free flowing and starts to form a tacky cohesive ball. The end point is reached when the sample is in this condition and is able to detach from the tip of the stick or from the surface of the hot plate. The test is repeated until at least two sets of results are consistent.

Resistance to solvent for coating films was assessed by placing a cotton wool pad over the ball head of a nominal 1 lb (0.454kg) ball headed hammer. This is covered with a 5 cm square of suitable fabric. The cotton pad and fabric are secured to the hammer with a cable tie, ensuring that the fabric is taut and without wrinkles, creases or bagginess. Sufficient methyl ethyl ketone (MEK) is applied to the fabric to wet thoroughly the cotton wool without leaving excess solvent. The ball head of the hammer is placed on the painted surface of a prepared panel of the paint to be tested. The hammer is pushed across the width of the panel and then pulled back to its original position. Care is taken to ensure no downward or upward pressure is exerted on the hammer during this action. This constitutes one double rub and should take approximately 1 second. This is repeated 300 times, or until the coating fails (the coating is rubbed through to the metal surface) if this is sooner. The number of double rubs to rub through, or 300 if no rub through is observed.

Resistance to solvent for coating film was also evaluated by acetone spot test. A drop of 50 µl acetone was placed onto the panel for 30 seconds, and then the panels were visually inspected for signs of etch. Test panels were rated visually on a scale 0 to 5. Evaluation; 0: no damage; 1: excellent, 2: good, 3: sufficient, 4: poor, 5: total destruction of coating layer.

To assess flow and appearance, powder coated test panels are compared to a set of Powder Coating Institute (PCI) standard panels. These panels represent the degrees of smoothness achievable with powder coatings and have graduated degrees of orange peel (flow) and powder smoothness from rough to smooth. The standard panels consist of ten 4×6 inch panels which are painted black and labelled with their corresponding orange peel (flow) rating from 1 (poor) to 10 (excellent). The test panels are compared to the standard panels in order to visually evaluate the appearance of painted test panels. The test panels are assigned the value of flow most closely matching that of the standard panels.

For following acryloyl conversion, a Nicolet iC10 FTIR instruments was used, equipped with a Specac Golden Gate ATR setup with diamond ATR crystal incorporated in a hot stage. Paint formulated, either dissolved in solvent or as powder paint, were applied directly onto the hot stage at the intended cure temperature. The conversion was followed as a function of time using the integration of the 810 cm-1 acryloyl peak, using the 1760 C═O absorbance band as reference.

ABBREVIATIONS

TABLE 1 description of the abbreviations used in the examples.

| | | |
|---|---|---|
| NPG | neopentyl glycol | |
| 1,6-HD | 1,6-hexanediol | |
| CHDM | 1,4-dimethylol cyclohexane | |
| IPA | isophthalic acid | |
| TPA | terephthalic acid | |
| tBAA | tert-butyl acetoacetate | |
| IPDI | isophorone diisocyanate | |
| HDI | hexamethylene diisocyanate | |
| TBAOH | tetrabutylammonium hydroxide | |
| TEAOH | tetraethylammonium hydroxide | |
| TEA acetate | tetraethylammonium acetate tetrahydrate | |
| DCC | dicyclohexylcarbodiimide | |
| DABCO | 1,4-diazabicyclo[2.2.2]octane | |
| DTMPTA | ditrimethylpropanetetraacrylate | |
| AV | acid value | |
| Net OHV | net hydroxyl value | |
| OHV | hydroxyl value | |
| Wt % | weight percent | |
| Mn | number average molecular weight | |
| Mw | weight average molecular weight | |
| Tg | glass transition Temperature | |
| EQW | equivalent weight | |
| Araldite ® PT912 | glycidyl ester resin (ex Huntsman) | epoxy EQW is 154 |
| Araldite ® GT7004 | bisphenol-A epoxy resin (ex Huntsman) | epoxy EQW is 752 |
| Cardura ™ E10P | glycidyl ester of Versatic ™ Acid 10 (ex Hexion) | epoxy EQW is 240 |
| UVECOAT ® 3005 | unsaturated resin containing both fumarate and methacrylate (ex Allnex) | overall C = C EQW is 723 (0.4 eq methacrylate and 1 eq fumarate per 1000 g); AV = 6 mg KOH/g; Tg = 48° C. |
| UVECOAT ® 9146 | unsaturated resin methacrylate (ex Allnex) | C = C EQW is 447; Tg = 55° C.; GPC Mn = 1481; Mw = 5829 |
| CRYLCOAT ® 1622-0 | carboxyl polyester powder coating resin (ex Allnex) | AV = 60 mg KOH/g; Tg = 54° C.; |
| Fascat ® 4100 | butylchlorotin dihydroxide catalyst (ex PMC) | |
| Acure 500 | $CO_2$ blocked base catalyst (ex Allnex) | |
| Acure 510-100 | malonate functional polyester (ex Allnex) | |
| Resionflow PV 88 | acrylic flow control agent (ex Worlee) | |
| MODAFLOW ® P6000 | powder coating flow modifiers on silica carrier (ex Allnex) | |

Preparation of Materials

Preparation of Malonate-Resin M-1

A 2 litre round bottomed reactor equipped with a 4 necked lid, metal anchor stirrer, Pt-100, Dean-Stark trap with cooler and a N2 inlet was charged with 510 g CHDM and 153.7 g IPA. The temperature of the reactor was gently raised to about 100° C., and 0.26 g of Fascat 4101 was added. The temperature was further increased to 200° C., and the reaction was continued until the acid value was below 0.50 mg KOH/g. During the last part of the reaction a nitrogen flow was used to push the reaction to completion. The temperature was lowered to 50° C., and 134.2 g of diethylmalonate was added. The temperature of the reactor was increased to 170° C. and maintained until no more ethanol was formed. After the transesterification was completed the hydroxyl value of the polyester was measured. Next, the temperature of vessel was set at 60° C. and 284.40 g of IPDI was added in a period of 3 to 4 hours whereby the temperature increased to 155° C. due to the exothermic reaction. After all IPDI was added the reaction was maintained for 30 minutes at 155° C. to complete the reaction. The final OHV was 46 mg KOH/g, with a GPC Mn of 3343 and a Mw of 7372, and a Tg (DSC) of 64° C. The acid value is less than 1 mg KOH/g.

Preparation of Malonate-Resin M-2

A 5 litre round bottomed reactor equipped with a 4 necked lid, metal anchor stirrer, Pt-100, packed column with top thermometer, condenser, distillate collection vessel, thermocouple and a N2 inlet was charged with 2900 g CHDM and 2300 g IPA. The temperature of the reactor was gently raised to about 100° C., and 3 g of Fascat 4101 catalyst was added. The reaction temperature was further increased gradually to 230° C., and the polymerization was progressed under nitrogen with continuous stirring until the reaction mixture is clear and the acid value is below 2 mg KOH/g. Depending on the measured OHV and the theoretical target OHV (88 mg KOH/g), a calculated quantity of CHDM was added to the reactor to compensate any loss of glycol during polymerization. During the last part of the reaction, vacuum was applied to push the reaction to completion. The temperature was lowered to 120° C., and 406 g of diethylmalonate was added. The temperature of the reactor was then increased to 190° C. and maintained until no more ethanol was formed. Again, vacuum was applied to push the reaction to completion. After the transesterification was completed, the hydroxyl value of the polyester was measured. The final OHV was 35 mg KOH/g, with a GPC Mn of 2150 and a Mw of 5750, and a Tg (DSC) of 42° C. The AV is less than 1 mg KOH/g.

Preparation of Malonate-Resin M-3

M-3 was prepared in a similar process as M-2. 1970 g NPG, 1800 g of TPA and 600 g of IPA were charged into the reaction vessel and condensed to very low acid value. 674 g of diethylmalonate was added to this oligomer resin and condensed further by removing ethanol from the mixture. After the transesterification was stopped, the malonate resin M-3 obtained was characterized by a final OHV of 16 mg KOH/g, with a GPC Mn of 3776, Mw 9774, and a Tg (DSC) of 37° C. The malonate EQW is 1000, the acid value is less than 1 mg KOH/g.

Preparation of Malonate-Resin M-4

M-4 was prepared in a similar process as M-2. 1840 g of NPG, 2455 g Isosorbide (80 wt %), 2746 g of TPA and 1000 g of IPA were charged into the reaction vessel and condensed with 7.50 g titanate catalyst to a very low acid value. 1247 g of diethylmalonate was added to this oligomer resin and condensed further by removing ethanol from the mixture. After the transesterification was stopped, the malonate resin M-4 obtained was characterized by a final OHV of 21 mg KOH/g, with a GPC Mn of 2183, Mw of 5448, and a Tg (DSC) of 61° C. The malonate EQW is 1000, the acid value is less than 1 mg KOH/g.

Preparation of Anhydride Modified Acid Functional Malonate-Resin AHM-4

700 g malonate M-4 and 20.74 g phthalic anhydride were added into a reaction vessel equipped with a mechanical stirrer. The reaction was continued at 170° C. with continuous stirring for 2.5 hours. The final product has a AV of 16 mg KOH/g. The GPC Mn was 1591 and Mw was 4084, with a Tg (DSC) of 49° C.

Preparation of Malonate—Carboxylate Polymer MC

A polymeric malonate-carboxylate polymer was prepared hydrolyzing a malonate polyester resin M-2 (Mn=2150) using TBAOH solution (55% wt in water) at elevated temperature. Briefly, 45.3 g malonate resin M-2 was first melted in a three-necked round bottom flask equipped with a condenser. Once the resin is completely melted, 4.71 g TBAOH solution was added dropwise into the flask at 140° C. Water was distilled out of the vessel, until complete. The final product has a GPC Mn of 797 and a Mw of 2772, and a base (carboxylate) concentration of 0.374 mol/kg.

Preparation of Master-Batch Resin MB-1

For the synthesis of master-batch resin, 1000 g malonate polyester resin M-4 and 750 g CRYLCOAT® 1622-0 were charged into a 3 litre reaction vessel. The resin mixture was then melted at 170° C. and homogenized with stirring. After that, the completed homogenized resin mixture was cooled down to 150° C., followed by addition of 343 g TBAOH solution (55 wt % in $H_2O$). The water was distilled out of the vessel. Finally, vacuum was applied for 15 minutes to push the residual water out of the resin mixture. The final product has an AV of 28 and Tg (DSC) of 36° C. The theoretical carboxylate concentration is 0.217 mmol/g.

Preparation of Acetoacetate Resin AA-1

AA-1 was prepared starting with the condensation of 484.1 parts of NPG (90 wt % in water), 21.40 parts of trimethylopropane, 681.5 parts of IPA, and 0.55 parts of Fascat 4100 as catalyst at 235° C., in the last stages with vacuum, to an acid value below 1 mg KOH/g. To 2500 g of this material, 327.80 g tBAA was added dropwise at 170° C. Tert-butanol was distilled out while the reaction proceeds at 170° C., until no more volatile was generated. Finally, excess tBAA was removed in vacuo. The final OHV was 3 mg KOH/g, with a GPC Mn of 2150 and a Mw of 15800, and a Tg (DSC) of 44° C. The acid value is negligible; the acetoacetate EQW is 2000 g/mole.

Preparation of Urethane Acrylate UA-1

For the synthesis, a 0.5 litre 4 necked round bottomed reactor is charged with 116.10 g of 2-hydroxyethyl acrylate (purified over basic $Al_2O_3$), 0.30 g 2,6-di-tert-butyl-4-methylphenol and 0.30 g dibutyltin dilaurate. The temperature of the reactor was increased to 55° C. and 111.2 g of IPDI was added over a period of 2.5 hours. After all the isocyanate was added, the reaction temperature was kept at 55° C. for 1 hour to complete the reaction. The resulting urethane-acrylate has an acryloyl functionality of two.

Preparation of Urethane Acrylate UA-2

A urethane-acrylate based on IPDI, hydroxy-propyl-acrylate, glycerine is prepared with the addition of suitable polymerization inhibitors, as described in e.g. EP0410241A2 and EP0585742. In a 5 litre reactor provided with thermometer, stirrer, dosing funnel and gas bubbling inlet, 1020 parts of IPDI, 1.30 parts of di-butyl-tin-dilaurate and 4.00 parts of hydroquinone are loaded. Then 585 parts of hydroxypropylacrylate are dosed, avoiding that temperature increases to more than 50° C. Once addition is completed, 154 parts of glycerine are added. 15 minutes after the exothermic reaction subsides, the reaction product is cast on a metallic tray. The resulting urethane-acrylate is characterized by a GPC Mn of 744 and Mw of 1467, Tg (DSC) of 51° C., residual isocyanate content <0.1%, and theoretical unsaturation EQW of 392.

Preparation of Semi-Crystalline Urethane Acrylate UA-3

In a 5 litre reactor provided with thermometer, stirrer, dosing funnel and gas bubbling inlet, 833 parts of IPDI, 913 parts of HDI, 4.20 parts of di-butyl-tin-dilaurate and 5.00 parts of butylated hydroxytoluene (BHT) are loaded. Then 395 parts of hydroxypropylacrylate are dosed over 60 minutes, avoiding that temperature increases to more than 35° C. Once addition is completed, 896 parts of 1,6-HD and 5 parts BHT are added. 15 minutes after the exothermic reaction subsides, the reaction product is cast on a metallic tray. The semi-crystalline urethane-acrylate obtained has a melting point of 125° C., Tg (DSC) of 17.7° C. and theoretical unsaturation EQW of 1004.

Preparation of Epoxy-Acrylate Resin EA-1

640 g bisphenol A epoxy resin (Mn=1075), 3.20 g 4-methoxyphenol (MEHQ), 3.20 g β-lonol and 4.73 g ethyltriphenylphosphonium bromide were charged into a 3 litre reaction vessel and heated to 135° C. with stirring. In a separate flask, 81.50 g acrylic acid was mixed with 0.08 g MEHQ and 0.03 g phenothiazine and then added into the reaction vessel over a period of 30 minutes. The reaction was allowed to proceed for another 5 hours at 130° C. until complete (AV=0). The final product has a GPC Mn of 1399, a Mw of 4956, a Tg (DSC) of 39° C. and theoretical unsaturation EQW of 637.

Preparation of Anhydride Modified Acid-Functional Epoxy-Acrylate Resin AHEA-1

137.10 g epoxy-acrylate EA-1 and 16.20 g phthalic anhydride were added into a reaction vessel equipped with a mechanical stirrer. The reaction was conducted at 140° C. with continuous stirring for 3 hours. The final product has AV of 30, Tg (DSC) of 36° C., GPC Mn was 2509 and Mw was 11770.

Preparation of Fumarate Polyester Resin FP-1

A 5 litre round bottomed reactor equipped with a 4 necked lid, metal anchor stirrer, Pt-100, packed column with top thermometer, condenser, distillate collection vessel, thermocouple and a N2 inlet was charged with 1563 g NPG and 2150 g IPA. The temperature of the reactor was gently raised to about 100° C., and 3.5 g of monobutyltin oxide (MBTO) catalyst was added. The reaction temperature was further increased gradually to 210° C., and the polymerization was progressed under nitrogen with continuous stirring until the reaction mixture is clear and the AV is below 8 mg KOH/g. In the 2ed step, 1060 g fumaric acid, 1.5 g MEHQ and 1.05 g phosphoric acid were added into the reaction vessel. The polymerization was conducted under vacuum until AV is below 5 mg KOH/g. The final product obtained has AV of 4.4 mg KOH/g, OHV of 46.3 mg KOH/g, Tg (DSC) of 37° C. and theoretical unsaturation EQW of 500.

Preparation of Tetrabutylammonium Benzoate 104.79 g TBAOH solution (55 wt % in $H_2O$) and 48.85 g benzoic acid were charged into a 250 ml round bottom flask, and mixed until all the solids were dissolved. Depending on the pH of the solution, additional TBAOH or benzoic acid was added to adjust the pH level to 7. The solution was then concentrate by partially evaporating the water and cooled down to allow crystallization to occur. After completing the crystallization, the obtained TBA benzoate was dried in a vacuum oven.

Curing Profile of the Catalyst System

In examples 1-9 was used: malonate resin M-1 (12.0 g; 21.8 meq reactive C—H) and urethane acrylate UA-1 (4.46 g; 19.6 meq acryloyl) and butylacetate solvent (11.1 g). Other components as well as the reaction times are listed in Table 2. Catalyst component C1 is Cardura™ E10P (CE-10), Catalyst component C2 is tetrabutyl ammonium benzoate, catalyst component C3 is either benzoic acid or lauric acid. The compositions were cured at temperatures 95 and 102° C.

The conversion was measured as a function of time to determine the reaction kinetic shape factor 60-20/20 (SF60) and shape factor 80-20/20 (SF80). The conversion is measured after application of the composition onto a heated ATR-FTIR stage, and measuring the conversion of the acryloyl groups, focusing on the 809 cm-1 band characteristic of the acryloyl moiety. The results are summarized in Table 2 below.

The shape factors are a characteristic of the reaction kinetics of the crosslinkable composition. The shape factor 60-20/20 is the ratio of the time to go from 20% to 60% acryloyl conversion to the time to reach 20% conversion. Similarly, the shape factor 80-20/20 is the ratio of the time to go from 20% to 80% acryloyl conversion to the time to reach 20% conversion. Preferably this shape factor is low, indicating that there is a substantial long open time providing film forming flow and good coating appearance and a small amount of time to achieve curing from 20 to 60 or 80% of the total conversion.

An alternative method to determine a kinetic profile shape factor SF(DSC), is using DSC (Differential Scanning Calorimetry). In this method, we measure the reaction exotherm of a powder paint composition at a relevant temperature as a function of time in an isothermal scan. The sample is heated to the cure temperature of interest at a rate of 60 C/min, and heat evolved is measured as function of time from this moment (t0). An exotherm peak is observed, typically after a certain induction time, and can be integrated to obtain a ΔHtotal. This exotherm can be replotted after integration as cumulative heat evolved after t0, and we can determine the times required to reach 20% or 60% of the ΔHtotal in this isothermal run (120 and t60). A shape factor SF(DSC) can be determined from the ratio the time to go from 20 to 60% exothermal heat evolved (t60-t20) and the time to reach 20% exothermal heat evolved (t20-t0).

$$SF(DSC)=(t60-t20)/(t20-t0)$$

This shape factor preferably has a value less than 1, more preferably less than 0.8, even more preferably less than 0.6, 0.4, most preferably less than 0.3. Moreover, the kinetics are preferably chosen such that the (t20-t0), when tested at 100° C., is preferably more than 1 minute, more preferably more than 2,3,5,8,12 minutes.

TABLE 2 examples 1-9 curing characteristics

| | Amounts in μeq/gr solids | | | | | | | FTIR shape | FTIR shape | |
|---|---|---|---|---|---|---|---|---|---|---|
| Example | TBA benzoate | benzoic acid | lauric acid | CE-10 | time to 20% (min) | time to 60% | time to 80% | factor (60-20)/20 | factor (80-20)/20 | T cure (° C.) |
| 1 | 15 | | | 15 | 4.84 | 10.35 | 14.55 | 1.14 | 2.01 | 102 |
| 2 | 15 | 7.5 | | 22.5 | 27.38 | 36.28 | 41.42 | 0.33 | 0.51 | 102 |
| 3 | 15 | 3.8 | | 19 | 13.25 | 25.72 | 38.67 | 0.94 | 1.92 | 102 |
| 4 | 15 | 7.5 | | 25 | 15.68 | 20.99 | 24.15 | 0.34 | 0.54 | 102 |
| 5 | 30 | 15 | | 50 | 17.83 | 20.28 | 22.01 | 0.14 | 0.23 | 95 |
| 6 | 30 | 15 | | 50 | 22.29 | 25.71 | 27.82 | 0.15 | 0.25 | 95 |
| 7 | 30 | | 15 | 50 | 17.97 | 21.84 | 23.93 | 0.22 | 0.33 | 95 |

TABLE 2-continued examples 1-9 curing characteristics

| Example | Amounts in μeq/gr solids TBA benzoate | benzoic acid | lauric acid | CE-10 | time to 20% (min) | time to 60% | time to 80% | FTIR shape factor (60-20)/20 | FTIR shape factor (80-20)/20 | T cure (° C.) |
|---|---|---|---|---|---|---|---|---|---|---|
| 8 | 60 | 30 | | 100 | 15.32 | 17.45 | 18.69 | 0.14 | 0.22 | 95 |
| 9 | 60 | | 30 | 100 | 15.75 | 18.44 | 19.56 | 0.17 | 0.24 | 95 |

The examples show the advantage of latency of the catalyst by presence of C3. Preferably the shape factor 60-20/20 (SF60) is below 1 more preferably below 0.8, 0.6, 0.4 or 0.3 and preferably also the SF80 is below 1.5 more preferably below 1, 0.5 or even below 0.35.

In example 10-11, malonate resin M-4 (5 g), urethane acrylate UA-2 (3.92 g) and catalyst component C1 Araldite® GT 7004 (1.14 g) were dissolved in acetone. To make-up the catalyst component C2, either TBAOH (0.24 g, 55 wt % in water) or TEAOH (0.33 g, 40 wt % in water) was neutralized with excess amount of benzoic acid respectively in a separate flask. The amount of each catalyst component in the formulation after neutralization is summarized in Table 3. The two solutions were then combined, and a thin film was casted onto a polypropylene panel. After that, acetone was removed under vacuum at 50° C. and the solids collected was measured in a DSC for isothermal analysis at 120° C. The results of isothermal DSC scans for example 10 and 11 show that approximately same time is required to complete curing at 120° C. for both example 10 & 11.

In example 12, anhydride modified acid functional malonate resin AHM-4 (5.0 g) was firstly dissolved in acetone, and then partially neutralized with TBA hydroxide (0.21 g, 55 wt % in water). In a separate flask, urethane acrylate UA-2 (3.92 g) and catalyst component C1 CE-10 (0.31 g) were also dissolved in acetone. The amount of each catalyst component in the formulation after neutralization is summarized in Table 3. The two solutions were then combined, and a thin film was casted onto a polypropylene panel. After that, acetone was removed under vacuum at 50° C. and the solids collected was measured in a DSC for isothermal analysis at 120° C.

In example 13, malonate resin M-4 (5.0 g) and catalyst component C1 Araldite® GT 7004 (1.76 g) were dissolved in acetone. In a separate flask, anhydride modified acid-functional epoxy-acrylate resin AHEA-1 (2.38 g) and epoxy-acrylate EA-1 (1.28 g) were also dissolved in acetone, and were then partially neutralized with TBA hydroxide (0.37 g, 55 wt % in water). The amount of each catalyst component in the formulation after neutralization is summarized in Table 3. The two solutions obtained were then combined, and a thin film was casted onto a polypropylene panel. After that, acetone was removed under vacuum at 50° C. and the solids collected was measured in a DSC for isothermal analysis at 120° C.

TABLE 3 example 10-13 curing characters.

| Example | Amounts in μeq/gr solids C2 | C3 | C1 | time to 20% (min) | time to 60% (min) | DSC shape factor (60-20)/20 | T cure (° C.) |
|---|---|---|---|---|---|---|---|
| 10 | 50 | 50 | 150 | 6.8 | 8.45 | 0.24 | 120 |
| 11 | 50 | 50 | 150 | 8.32 | 9.37 | 0.13 | 120 |
| 12 | 65 | 65 | 178 | 8.82 | 11.03 | 0.25 | 120 |
| 13 | 74 | 45 | 220 | 3.9 | 6.32 | 0.62 | 120 |

Example 10 & 11 showed TBA benzoate has similar reactivity as TEA benzoate at 120° C. This is also illustrated by similar times required to go from 20% to 60% exothermal heat in the isothermal runs.

In addition, the catalyst component C3 can be incorporated in the backbone of either component A as shown in example 12, or component B as shown in example 13. The corresponding C2 anions were then formed by partially neutralizing C3 with cation hydroxide. The curing profile is illustrated by the DSC shape factor.

Powder Paint Formulations

Powder paint formulations P1-P11 were prepared and applied as powder paints. The coatings were formulated without pigments, in a stoichiometry to have a reactive acryloyl ratio/C—H2 of 2:1. Other components including additives are summarized in Table 4. Catalyst component C1 is Araldite® PT 912 or Araldite® GT 7004; catalyst component C2 is tetrabutylammonium benzoate (TBA benzoate), catalyst component C3 is benzoic acid. To prepare the powder RMA coatings, a double extrusion method was conducted to ensure a good mixing. Firstly, the two resins components were pre-extruded at a relatively low extruder speed (100 rpm). The pre-extruded materials obtained were then crushed and mixed with the catalyst components as well as the flow additive in a high speed Thermoprism Pilot Mixer 3 pre-mixer at 1500 rpm for 20 seconds, before extruding again at a relatively fast extruder speed (250 rpm). For both extrusion steps, the four extruder barrel zone temperatures were set at 15, 25, 80 and 100° C. Following extrusion, coatings were ground using a Kemutec laboratory classifying microniser. The classifier was set at 5.5 rpm, the rotor was set at 7 rpm and the feed was set at 5.2 rpm. The coatings were sieved to 100 μm using Russel Finex 100-micron mesh Demi Finex laboratory vibrating sieves. Formulation compositions (as parts by weight) for P1 through P11 are given in Table 4.

TABLE 4

Powder paint formulation of compositions P1-P11

| | Powder RMA Coating Example | | | | | | | | | | |
|---|---|---|---|---|---|---|---|---|---|---|---|
| | P1 | P2 | P3 | P4 | P5 | P6 | P7 | P8 | P9 | P10 | P11 |
| Component A | | | | | | | | | | | |
| M-2 | 229.00 | 229.00 | 229.00 | 409.52 | | | 333.72 | | | | |
| M-3 | | | | | | 167.80 | | | 154.00 | 200.00 | 224.00 |
| AA-1 | | | | | 700.00 | | | | | | |
| M-4 | | | | | | | | 537.80 | | | |
| Component B | | | | | | | | | | | |
| UA-2 | 100.00 | 100.00 | 100.00 | 178.83 | 275.59 | | 145.73 | 423.0 | | | |
| UVECOAT ®3005 | | | | | | 121.60 | | | | | |
| UVECOAT ®9146 | | | | | | | | | | | 100.00 |
| EA-1 | | | | | | | | | 200.00 | | |
| FM-1 | | | | | | | | | | 100.00 | |
| Components C | | | | | | | | | | | |
| Araldite ® PT 912 | 3.53 | 3.53 | 3.53 | 5.68 | 10.78 | 4.50 | 4.62 | 14.40 | | | |
| Araldite ® GT 7004 | | | | | | | | | 59.90 | 22.56 | 25.27 |
| TBA benzoate | 4.16 | 4.16 | 4.16 | 4.47 | 12.73 | 3.10 | | 9.80 | 9.65 | 3.64 | 4.07 |
| MC | | | | | | | 26.77 | | | | |
| Benzoic acid | 0.00 | 0.70 | 1.40 | 1.50 | 2.14 | | 1.84 | 5.00 | 3.24 | | 1.37 |
| Additives | | | | | | | | | | | |
| Resiflow PV88 | 2.60 | 2.60 | 2.60 | 4.58 | 10.00 | | 3.91 | | 2.50 | 2.50 | 2.50 |
| MODAFLOW ® P6000 | | | | | | 3.00 | | 10.00 | | | |

Powder paint formulations P12-P15 were prepared using the master-batch resin MB-1 and urethane-acrylate UA-2 acceptor resin. The coatings P12-P14 were formulated without pigments, and in a stoichiometry to have a reactive acryloyl/C—H2 ratio of 2:1, 1:1 and 0.75:1, respectively. The coating P12 were formulated with 20% Kronos® 2160 pigment, and in a stoichiometry to have a reactive acryloyl/C—H2 ratio of 1:1. Catalyst component C1 is Araldite® GT 7004. To prepare the powder RMA coatings, the resins and catalyst components were firstly crashed and mixed using a GRINDOMIX knife mill (5000 rpm) for 5 seconds. The mixture is then fed through a TSA twin-screw extruder operated at 300 rpm. The five extruder barrel zone temperature were set at 60, 100, 120, 120 and 120° C. Following extrusion, coatings were ground twice using a GRINDOMIX knife mill (10000 rpm) for 20 seconds. The coatings were then sieved using a 90 μm mechanical sieve.

Powder paint formulations P16-P19 were prepared using the malonate resin M-4 and urethane-acrylate UA-2 acceptor resin. The coatings P16-P19 were formulated without pigments, and in a stoichiometry to have a reactive acryloyl/C—H2 ratio of 2:1. Other components including additives are summarized in Table 5. For paints P16 and P17, the catalyst system comprising a base blocked with weakly acidic species. For paint 16, component C1 is Araldite® GT 700; catalyst component C2 is 1,4-diazabicyclo[2.2.2]octane (DABCO). For paint 17, component C1 is dicyclohexylcarbodiimide (DCC); catalyst component C2 is TBA benzoate. In all case above, the catalyst component C3 is benzoic acid. The RMA powder coatings were prepared using a process similar to powder paint formulations P1-P11.

TABLE 5

Powder paint formulation of compositions P16-P19

| Powder RMA Coating Example | P16 | P17 | P18 | P19 |
|---|---|---|---|---|
| Component A | | | | |
| M-4 | 300.00 | 300.00 | 254.00 | 254.00 |
| Component B | | | | |
| UA-2 | 236.00 | 236.00 | 200.00 | 200.00 |
| Components C | | | | |
| Araldite ® GT 7004 | | | 81.52 | |
| DCC | | | | 14.59 |
| TBA benzoate | 9.75 | | | 8.57 |
| TEA acetate | | 7.01 | | |
| DABCO | | | 3.04 | |
| Benzoic acid | 0.33 | 1.31 | 6.62 | 2.88 |
| Additives | | | | |
| Resiflow PV88 | 2.50 | 2.50 | 2.50 | 2.50 |

Powder paint formulations P20-P21 were prepared using the malonate resin M-4 and urethane-acrylate UA-2 acceptor resin. The coatings P20 was formulated without pigments, whereas the coating P21 was formulated with 20% Kronos® 2160 pigment. In both case, a stoichiometry to have a reactive acryloyl/C—H2 ratio of 2:1 was formulated and approximately 10% MODAFLOW® P 6000 was added as flow additive. Catalyst component C1 is Araldite® PT 912; catalyst component C2 is TBA benzoate, catalyst component C3 is benzoic acid. The RMA powder coatings P18 & P19 were prepared using a process similar to powder paint formulations P12-P15.

Powder paint formulations P22-P24 were prepared using the malonate resin M-4, urethane-acrylate UA-2 and semi-crystalline UA-3 acceptor resins. The coatings P21-P23 were formulated without pigments, and in a stoichiometry to have a reactive acryloyl/C—H2 ratio of 1.65:1. Other components including additives are summarized in Table 6. Catalyst component C1 Araldite® GT 7004; catalyst component C2 is TBA benzoate, catalyst component C3 is benzoic acid. The RMA powder coatings were prepared using a process similar to powder paint formulations P1-P11.

TABLE 6

Powder paint formulation of compositions P22-P24

| Powder RMA Coating Example | P22 | P23 | P24 |
|---|---|---|---|
| Component A | | | |
| M-4 | 172.00 | 172.00 | 172.00 |
| Component B | | | |
| UA-2 | 100.00 | 100.00 | 100.00 |
| UA-3 | 30.00 | 30.00 | 30.00 |
| Components C | | | |
| Araldite ® GT 7004 | 30.04 | 35.16 | 41.55 |
| TBA benzoate | 6.18 | 6.18 | 6.18 |
| Benzoic acid | 0.73 | 1.56 | 2.60 |

Powder Coating Evaluation

For evaluating the powder coating quality, the obtained powders were applied onto panels using a Nordson Surecoat corona spray gun. For appearance assessment, coatings were applied onto 100 mm×300 mm aluminum panels. Examples P1-P19 were cured at the indicated temperatures for 20 minutes. Paint P4 was also cured for a shorter cure time of 10 mins at 120° C. Paint 20 and 21 were applied onto MDF and cured using infrared heating at 130° C. In all cases, cured film thickness was 60-80 μm. The samples were cooled by ambient conditions and the appearance and solvent resistance were measured between 24 and 36 hours after curing. The coating evaluation results were summarized in Table 7, 9, 10, 11 and 12. The numbers in the example codes correspond to the numbers of the formulations given above.

TABLE 7

Summary of powder coating evaluation results P1-P4.

| Coating Example | DSC Tg (° C.) | Curing Temp (° C.) | Time (min) | Gel time (s) | Film Tg (max E") (° C.) | Film thickness (μm) | XLD (mmole/cc) | Solvent Resistance (MEK rubs) | PCI |
|---|---|---|---|---|---|---|---|---|---|
| PC1A | 43 | 120 | 20 | 90 | 87 | 61 | 0.15 | 300 | 2 |
| PC1B | | 140 | 20 | 39 | 89 | 61 | 0.17 | 300 | 2 |
| PC2A | 41 | 120 | 20 | 160 | 87 | 75 | 0.16 | 300 | 3 |
| PC2B | | 140 | 20 | 70 | 90 | 71 | 0.17 | 300 | 5 |
| PC3A | 40 | 120 | 20 | 324 | 87 | 68 | 0.16 | 300 | 6 |
| PC3B | | 140 | 20 | 121 | 89 | 73 | 0.17 | 300 | 7 |
| PC4A | 40 | 120 | 20 | 232 | 89 | 62 | 0.22 | 300 | 5 |
| PC4B | | 140 | 20 | 99 | 92 | 79 | 0.27 | 300 | 8 |
| PC4C | | 120 | 10 | 232 | 88 | 70 | 0.18 | 300 | 6 |

The curing of coatings P1 to P4 were also measured with FTIR following cure at 120° C. as a function of time to determine the reaction kinetic shape factor 60-20/20 (SF60) and shape factor 80-20/20 (SF80). The conversion is measured by measuring the conversion of the acryloyl groups in the composition by FTIR, focusing on the 809 cm-1 band that is characteristic of the acryloyl. The results are summarized in the Table 4 below. It can be seen that in all cases, most of the conversion has taken place before 10 minutes, with the samples containing benzoic acids creating an induction time before maximum cure rate develops. The results of this induction time can be seen as an improved appearance as illustrated by the PCI rating in the table above. The shape factors of the conversion curves, introduced before, are determined, and listed below in Table 8.

TABLE 8 conversion kinetics of curing paint formulations P1-P4

| | Amount in μeq/g donor resin | | | | | | FTIR shape | FTIR shape |
|---|---|---|---|---|---|---|---|---|
| Example | TBA benzoate | Benzoic Acid | PT 912 | time to 20% (min) | time to 60% (min) | time to 80% (min) | factor (60-20)/20 | factor (80-20)/20 |
| P1 | 50 | 0 | 100 | 0.52 | 1.42 | 4.79 | 2.2 | 6.6 |
| P2 | 50 | 25 | 100 | 1.68 | 2.50 | 6.09 | 0.76 | 1.77 |
| P3 | 50 | 50 | 100 | 3.95 | 3.93 | 6.81 | 0.27 | 0.42 |
| P4 | 30 | 50 | 60 | 5.6 | 9 | 13 | 0.6 | 1.3 |

The data illustrate that the addition of benzoic acid component C3 provides a latency to the curing of the powder paint as illustrated by the shape factor.

TABLE 9

Summary of powder coating evaluation results P5-P11.

| Coating Example | DSC Tg (° C.) | Curing Temp (° C.) | Time (min) | Gel time (s) | Film Tg (max E") (° C.) | Film thickness (μm) | XLD (mmole/cc) | Solvent Resistance (MEK rubs) | PCI |
|---|---|---|---|---|---|---|---|---|---|
| PC5A | 43 | 140 | 20 | 137 | 82 | 78 | 0.15 | 290 | 3 |
| PC5B | | 160 | 20 | 61 | 82 | 64 | 0.14 | 300 | 3 |
| PC6A | 38 | 120 | 20 | 360 | 73 | 70 | 0.35 | 226 | 5 |
| PC6B | | 140 | 20 | 192 | 76 | 80 | 0.35 | 230 | 6 |
| PC7A | n.d. | 120 | 20 | 535 | 82 | 70 | 0.29 | 250 | 6 |
| PC7B | | 140 | 20 | 231 | 82 | 72 | 0.20 | 230 | 6 |
| PC8A | 54 | 120 | 20 | 230 | 112 | 67 | 0.58 | 300 | 5 |
| PC9A | 39 | 120 | 20 | 289 | 94 | 73 | 0.38 | 300 | 5 |
| PC9B | | 140 | 20 | 131 | 95 | 70 | 0.44 | 300 | 5 |
| PC10 | 36 | 140 | 20 | 95 | 91 | 79 | 0.24 | 300 | 5 |
| PC11 | 40 | 140 | 20 | 125 | 93 | 73 | 0.28 | 290 | 4 |

Examples P5-P11 show variations can be made in RIMA coating composition for both component A and B, while still achieving good curing at relatively low temperature. This is Illustrated by obtaining good crosslinking density XLD and solvent resistance results, as summarized in Table 9. PC8 was prepared with materials comprising isosorbide, and consequently has much higher Tg than the rest of examples.

TABLE 10

Summary of powder coating evaluation results for P12-P15.

| Coating Example | DSC Tg (° C.) | Curing Temp (° C.) | Gel time (s), 140° C. | Film thickness (μm) | Solvent resistance (spot test, acetone) | PCI |
|---|---|---|---|---|---|---|
| PC12 | 51 | 120 | 230 | 70-78 | 1-2 | 5-6 |
| PC13 | 53 | 120 | 245 | 70-77 | 1-2 | 3-4 |
| PC14 | 53 | 120 | 270 | 78-88 | 2-3 | 5 |
| PC15 | 52 | 120 | 260 | 78-87 | 2-3 | 3-4 |

Example P12-P15 demonstrate RMA coatings can be prepared with materials contain acid/carboxylate functional polyester to provide C2 and C3. The ratio of acryloyl/C—H2 was varied in the formulation (PC12-PC14) and a pigmented RMA coating (PC15) was also prepared. Relatively good curing can be achieved at 120° C. in all cases above, as illustrated by acetone spot test results shown in Table 10.

TABLE 11

Summary of powder coating evaluation results for P16-P19.

| Coating Example | DSC Tg (° C.) | Curing Temp (° C.) | Film thickness (μm) | Solvent resistance (MEK rubs) | PCI |
|---|---|---|---|---|---|
| PC16A | 46 | 120 | 73 | 10 | 4 |
| PC16B | | 140 | 70 | 110 | 4 |
| PC16C | | 150 | 73 | 150 | texture |
| PC17A | 57 | 120 | 66 | 30 | 3 |
| PC17B | | 130 | 65 | 70 | 3 |
| PC17C | | 140 | 60 | 210 | texture |
| PC18A | 54 | 120 | 80 | 70 | 4 |
| PC18B | | 140 | 88 | 300 | 4 |
| PC19A | 53 | 120 | 60 | 300 | 3 |
| PC19B | | 140 | 70 | 300 | 3 |

PC16 and 17 demonstrated RMA powder coatings with catalyst system of LCE. Such catalyst system is less preferred over LCC as evaporation of volatile acid is difficult to control during the curing process. At higher curing temperature, faster acid evaporation at film surface can lead to a gradient in curing speed. As a result, textured surfaces were observed in such conditions due to faster curing at film surface.

Good curing can be achieved for LCC system using DABCO as C2 component. This is illustrated by the good solvent resistance result obtained for PC18.

PC19 demonstrates carbodiimide can be used as an alternative to epoxy as catalyst component C1 in LCC system to achieve good curing at 120 and 140° C.

TABLE 12

Summary of powder coating evaluation results for P20 and P21.

| Coating Example | DSC Tg (° C.) | Curing Temp (° C.) | Time (min) | Gel time (s), 140° C. | Pencil hardness | Solvent resistance (spot test, acetone) | Gloss, 20°/60° |
|---|---|---|---|---|---|---|---|
| PC20 | 54 | 130 | 5 | 230 | 2H | 1 | 44.5/89.8 |
| PC21 | 54 | 130 | 2.5 | 255 | 2H | 1 | 34.0/79.8 |

The results showed in Table 12 were obtained from application tests on MDF panels. As can be seen from the results, good curing and solvent resistance were achieved in a short time using infrared heating.

TABLE 13 conversion kinetics of curing paint formulations P22-P24

| Example | Amount in µeq/g donor resin TBA benzoate | Benzoic Acid | GT 7004 | time to 20% (min) | time to 60% (min) | DSC shape factor (60-20)/20 | T curing (° C.) |
|---|---|---|---|---|---|---|---|
| P22 | 50 | 35 | 135 | 0.94 | 1.54 | 0.63 | 120 |
| P23 | 50 | 75 | 175 | 1.93 | 2.54 | 0.32 | 120 |
| P24 | 50 | 125 | 225 | 3.34 | 4.05 | 0.21 | 120 |

The curing of coatings P22 to P24 were measured with DSC isothermal scans at 120° C. to determine the reaction kinetic shape factor SF(DSC) 60-20/20. The results are summarized in the Table 13 above. The data shows that the addition of benzoic acid component C3 provides a latency to the curing of the powder paint as illustrated by decreasing in the DSC shape factor.

Curing Characteristics of Latent Catalyst System LCC2 for Acrylate Component B

Model formulations were prepared in solvent butylacetate using as catalyst system LCC2 a $CO_2$ blocked base (Acure® 500) that deblocks very rapidly at 100° C. which forms in combination with component S3 creates an S2/S3 mixture of X—H acid and conjugated base $X^-$ ; a latent catalyst system LCC2.

The crosslinkable components used were 10 g of a malonate functional polyester Acure® 510-100 and 4.95 g DTMPTA (acrylate functional). Then, 0.72 g of Acure® 500 catalyst was added with or without a component S3 When XH components S3 were used, they were added at 2 mmole level. The solutions were applied as thin (target dry film thickness 60 µm) onto an ATR crystal preheated to 100 C, and the concentration of acrylate as a function of time was tracked using FTIR.

Without S3 additive, the film immediately crosslinked, and detached from the ATR crystal before a first FTIR measurement was completed. Similar observations were obtained when S3 additives as succinimide (pKa=9.5) and 1,2,4-triazole (pKa=10.4). So, X—H compounds that are known to be effective retarders for ambient temperature cure of acrylate-based compositions were found to be not suitable for use at powder curing temperatures. Also, when using p-toluenesulfonamide (pka=10.17) and 5,5-dimethylhydantoin (pKa=9.19) insufficient delay was still observed.

Useful delayed curing under these 100° C. curing conditions could be observed for S1 acrylate based compositions comprising S3 components characterized by lower pKa values. The table below indicates the observed times to reach 20, 50 and 60% C═C conversion.

TABLE 14 curing characteristics of LCC2 components S2 for acrylate

| S3 component | pKa | t(20%) min | t(50%) min | t(60%) min |
|---|---|---|---|---|
| 1,3-cyclohexanedione | 5.3 | 5 | 9.5 | 8 |
| Meldrum's acid | 5 | 8 | 21 | 17 |
| ethyltrifluoracetoacetate | 7.6 | 21 | 63 | n.d. |
| diethyloxalpropionate | | 23 | 51 | n.d. |

n.d.: not determined

It was found that for Michael acceptor S1 other than acrylates, for example methacrylates, fumarates and maleates, other requirements apply for the S3/S2 components to give sufficient retardation of the catalyst system.

Curing Characteristics of Latent Catalyst System LCC2 for Methacrylate Component B For methacrylate functional components B, FTIR experiments were done again on an ATR crystal preheated to 100° C., as described above. In this case, the same Acure® 510-100 donor (10 g) was used mixed with (acrylate functional) TMPTMA acceptor (2.4 g). Acure® 500 blocked base initiator was used in the formulation at 50 µeq/g solid binders; when X—H species were used as S3 (forming S2 upon neutralization), the amount relative to the base is given in the table below. Experiments were conducted as described above.

For such a composition based on a methacrylate components S1/B, not containing any S3 component, we observe that curing for this composition with high concentrations of acceptor and donor groups is quite rapid at 100° C., and essentially completed within minutes. Using succinimide, 1,2,4-triazole or benzotriazole, a useful delay of cure can be obtained at the practical levels indicated

TABLE 15 curing characteristics of LCC2 components S2 for Methacrylate

| | pKa | t(20%) min | t(50%) min | t(60%) min |
|---|---|---|---|---|
| none | | 0.5 | 1.2 | 1.3 |
| succinimide (2.3 eq/base) | 9.5 | 5.3 | 12 | 15 |
| 1,2,4-triazole (6 eq/base) | 10.4 | 2 | 2.8 | 3.2 |
| benzotriazole (3 eq/base) | 8.2 | 8 | 10.5 | 12 |

The examples show X—H compounds having pKa above 8 do not efficiently retard when S1 (=B) is an acrylate. Therefore, in case S1 is acrylate in catalyst system LCC2, it is preferred to use as component S2 an X—H component with pKa<8. In case component S1 (=B) is methacrylate in catalyst system LCC2, it is preferred to use as component S2 an X—H component with pKa below 10.5.

The invention claimed is:

1. A powder coating composition comprising one or more crosslinkable components and a catalyst, wherein the one or more crosslinkable components are crosslinkable by Real Michael Addition (RMA) reaction, and the powder coating composition comprises a. a crosslinkable component A having at least 2 acidic C—H donor groups in activated methylene or methine, b. a crosslinkable component B having at least 2 activated unsaturated acceptor groups C═C, which react with component A by Real Michael Addition (RMA) to form a crosslinked network, c. a latent catalyst system C comprising a strong base or a precursor of a strong base to catalyze the RMA crosslinking reaction with a delay at a curing temperature of at least 80° C. and below 200° C., wherein the catalyst system C is a latent catalyst system LCC having chemical latency comprising components that react at the curing temperature to initiate the reaction between crosslinkable components A and B with a delay, said latent catalytic system LCC comprising embodiment LCC2:

a) a weak base C2 that is a Michael addition donor S2, and b) an activator C1 that is a Michael acceptor S1 comprising an activated unsaturated group C═C reactive with S2 at the curing temperature, c) optionally further comprising an acid C3 being an acid S3 of which the corresponding base also is a Michael addition donor, or a protonated S2, wherein in case S1 is an acrylate, S2 has a pKa of the conjugated acid below 8, wherein pKa is defined as the value in an aqueous environment, and in case S1 is a methacrylate, fumarate, itaconate or maleate, S2 has a pKa of the conjugated acid below 10.5, and wherein the powder coating composition has a curing profile, as determined by measuring the conversion of the unsaturated bonds C═C of component B as a function of time by FTIR, at a curing temperature chosen between 80, 90, 100 and 200, 150, 135 or 120° C., wherein the ratio of the time to go from 20% to 60% C═C conversion to the time to reach 20% conversion is less than 1, with the time to reach 60% conversion being less than 30, and with the time to reach 20% conversion at 100° C. is at least 1 minute.

2. The powder coating composition according to claim 1, wherein in latent catalyst system embodiment LCC2 the weak base S2 is selected from the group consisting of phosphines, N-alkylimidazoles and fluorides or is a weak base nucleophile anion X-from an acidic X-H group containing compound wherein X is N, P, O, S or C, wherein anion X- is a Michael Addition donor reactive with activator S1 and anion X- is characterized by a pKa of the corresponding conjugate acid X—H of less than 8 and more than 1 units lower than the pKa of the acidic C—H groups of majority component A, and the latent catalyst system comprises acid S3 having a pKa of more than 1 units lower than the pKa of the acidic C—H groups of majority component A, or wherein acid S3 is a protonated S2.

3. The powder coating composition according to claim 1, wherein weak base C2 is added as a salt comprising a cation that is not acidic, or a cation according to formula $Y(R')_4$, wherein Y represents N or P, and wherein each R' can be a same or different alkyl, aryl or aralkyl group possibly linked to a polymer.

4. The powder coating composition according to claim 1, comprising a. in catalyst system LCC2, an activator S1 in an amount of at least 1 µeq/gr, b. weak base C2 in an amount between 1 and 300 µeq/gr relative to total weight of binder components A and B and catalyst system LCC, c. optionally an acid C3 in an amount between 1 and 500 µeq/gr, d. wherein the amount of C1 or respectively S1 i. is higher than the amount of C3 by an amount between 1 and 300 µeq/gr, or ii. is higher than the amount of C2, or iii. is higher than the sum of the amount of C2 and C3.

5. The powder coating composition according to claim 1, a. wherein the weak base C2 represents between 10 and 100 mol % of the sum of C2 and C3, or b. the amount of acid C3 is 20-400 mol % of the amount of C2, or c. wherein the ratio of the molar amount of C1 to the sum of the amount of C2 and C3 is at least 0.5, and at most 3 or d. the ratio of C1 to C3 is at least 1.

6. The powder coating composition according to claim 1 wherein a. crosslinkable component A comprises at least 2 acidic C—H donor groups in activated methylene or methine in a structure Z1 (—C(—H) (-R)-) Z2 wherein R is hydrogen, a hydrocarbon, an oligomer or a polymer, and wherein Z1 and Z2 are the same or different electron-withdrawing groups selected from keto, ester or cyano or aryl groups, and comprises an activated C—H derivative having a structure according to formula 1:

Formula 1

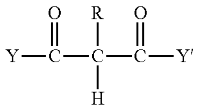

wherein R is hydrogen or an optionally substituted alkyl or aryl and Y and Y' are identical or different substituent groups selected from alkyl, aralkyl or aryl, or alkoxy or wherein in formula 1 the —C (═O)-Y and/or —C (═O)-Y' is replaced by CN or aryl, with no more than one aryl or wherein Y or Y' can be NRR', and R and R' are H or optionally substituted alkyl, wherein R, Y or Y' optionally provide connection to an oligomer or polymer, said component A providing at least 50% of the total of C—H acidic groups in crosslinkable component A, b. Component B comprising the at least 2 activated unsaturated RMA acceptor groups originate from acryloyl, methacryloyl, itaconates, maleate or fumarate functional groups, wherein at least one of components A or B is a polymer and wherein the composition comprises a total amount of donor groups C—H and acceptor groups C═C per gram binder solids of from 0.05 to 6 meq/gr binder solids and the ratio of acceptor groups C═C to donor groups C—H is more than 0.1 and less than 10.

7. The powder coating composition according to claim 1, wherein at least one of crosslinkable components A or B or a hybrid A/B is a polymer, selected from the group consisting of acrylic, polyester, polyester amide, and polyester-urethane polymers, which polymer a) has a number average molecular weight Mn, as determined with GPC, of at least 450 gr/mole, b) has a weight average molecular weight Mw, as determined with GPC, of at most 20000 gr/mole, c) has a molecular weight distribution Mw/Mn below 4 d) has an equivalent weight EQW in C—H or C═C of at least 150 gr/mole and at most 2500 gr/mole and a number average functionality of reactive groups C—H or C═C between 1-25 C—H groups per molecule, e) has a melt viscosity at a temperature in the range between 100 and 140° C. less than 60 Pas, f) comprises amide, urea or urethane bonds, or g) has a Tg above 25° Cas as the midpoint value determined by DSC at a heating rate of 10° C./min or is a crystalline polymer with a melting temperature between 40°° C. and 150 as determined by DSC at a heating rate of 10° C./min.

8. The powder coating composition according to claim 1, comprising one or more components A or B or components of catalyst system C or separate different plasticizers that are in a (semi-) crystalline state in the powder and have a melting temperature between 40 and 130° C.

9. The powder coating composition according to claim 1 wherein component B is a polyester (meth-) acrylate, a polyester urethane (meth-) acrylate, an epoxy (meth-) acrylate or a urethane (meth-) acrylate, or is a polyester comprising fumarate, maleate or itaconate units, or is a polyester end-capped with isocyanate or epoxy functional activated unsaturated group.

10. A process for the preparation of a powder coating composition according to claim 1, comprising the step of a. Providing component A, component B, catalyst system C and optional additives, b. Extruding the components at a temperature Tcomp below 140° C., c. Cooling, which optionally includes an annealing step to allow crystallization of crystallizable components, d. shaping the extruded mixture to form a granulate, before, during or after cooling, e. Optionally adding further additives, and f. Grinding the granulate to powder.

11. A method for powder-coating a substrate comprising a. Providing a powder having a powder coating composition according to claim 1, b. Applying a layer of the powder to a substrate surface wherein the substrate is a temperature sensitive substrate, and c. Heating to a curing temperature Tcur between 75 and 200° C., d. wherein the melt viscosity at the curing temperature Tour is less than 60 Pas, e. and curing at Tcur for a curing time less than 40 minutes.

12. Articles coated with a powder having a coating composition according to claim 1, having a temperature sensitive substrate and wherein the crosslinking density XLD is at least 0.01 mmol/ml as determined by DMTA, and is lower than 3 mmol.

13. The powder coating composition according to claim 1, wherein weak base C2 is added as a salt comprising a cation wherein the cation is a protonated strong basic amine, which strong basic amine is selected from the group consisting of 1,8-diazabicyclo (5.4.0) undec-7-ene (DBU), and 1,1,3,3-tetramethylguanidine (TMG).

* * * * *